(12) United States Patent
Lee

(10) Patent No.: US 8,005,769 B2
(45) Date of Patent: Aug. 23, 2011

(54) COMPUTER-IMPLEMENTED METHOD OF GENERATING ASSOCIATION RULES FROM DATA STREAM AND DATA MINING SYSTEM

(75) Inventor: Won Suk Lee, Seoul (KR)

(73) Assignee: Lee, Won Suk, Seoul (KR)

( * ) Notice: Subject to any disclaimer, the term of this patent is extended or adjusted under 35 U.S.C. 154(b) by 798 days.

(21) Appl. No.: 12/033,150

(22) Filed: Feb. 19, 2008

(65) Prior Publication Data

US 2009/0055332 A1 Feb. 26, 2009

(30) Foreign Application Priority Data

Aug. 20, 2007 (KR) .................. 10-2007-0083432

(51) Int. Cl.
*G06F 7/00* (2006.01)
(52) U.S. Cl. .................. 706/12; 706/47; 707/100
(58) Field of Classification Search .................. 706/12
See application file for complete search history.

(56) References Cited

U.S. PATENT DOCUMENTS

2006/0174024 A1* 8/2006 Chi et al. .................. 709/231
2007/0198548 A1* 8/2007 Lee .................. 707/100

* cited by examiner

*Primary Examiner* — David R Vincent
*Assistant Examiner* — Ola Olude-Afolabi

(57) ABSTRACT

A method of generating association rules from a data stream, which is a non-limited data set composed of transactions, includes: when itemsets in the generated transactions and the counts of the itemsets are managed using a prefix tree, and each node of the prefix tree has information on the count of a specific itemset corresponding to the node and a specific item, updating the information of a node corresponding to the itemset or adding a new node on the basis of the itemset included in the generated transaction and the count of the itemset; comparing the support of the itemset corresponding to each of the nodes of the prefix tree with a minimum support to select frequent itemsets; and visiting all or some of the nodes corresponding to the selected frequent itemsets and generating the association rule on the basis of the information of each of the visited nodes.

20 Claims, 17 Drawing Sheets

[FIG. 1]
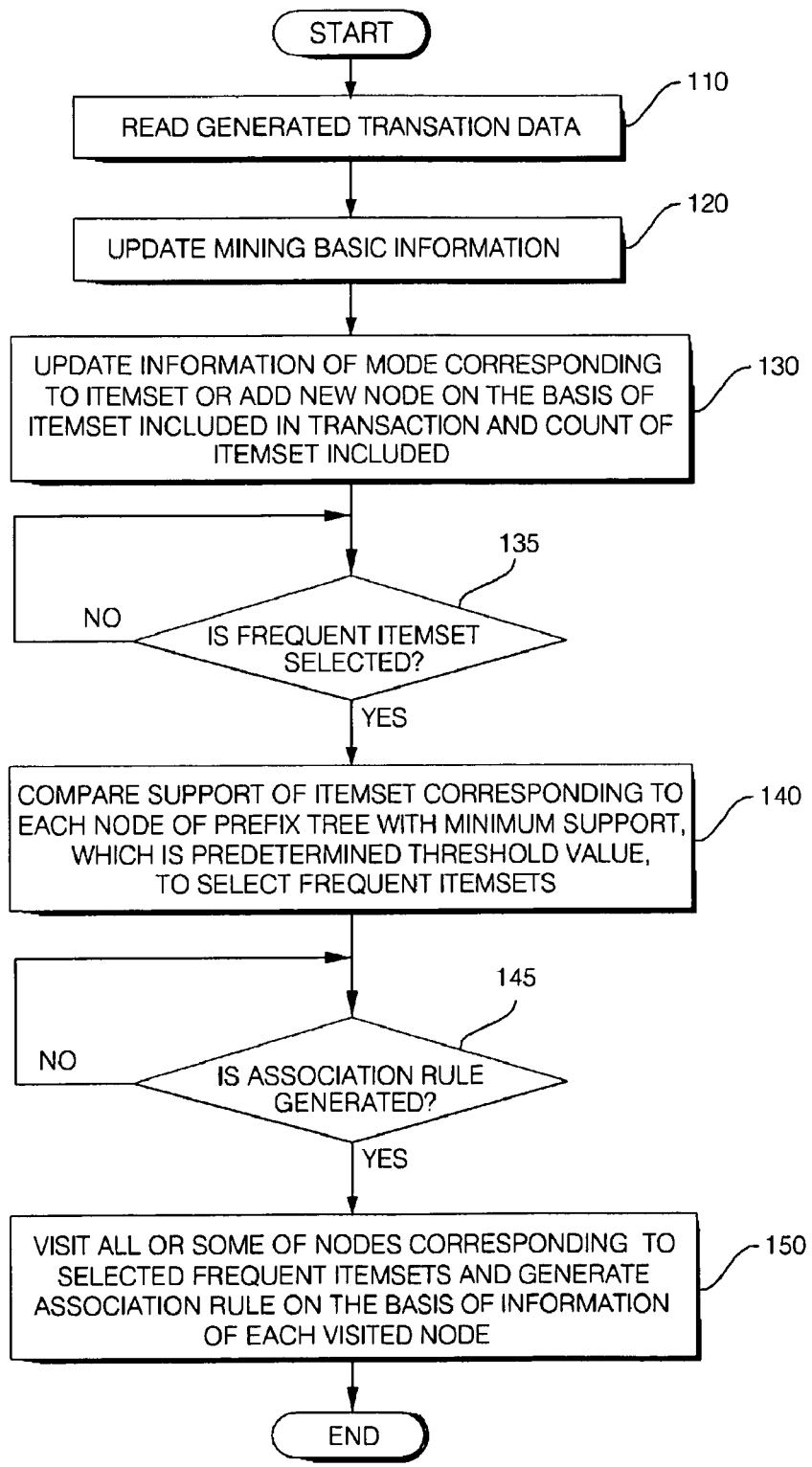

[FIG. 2]
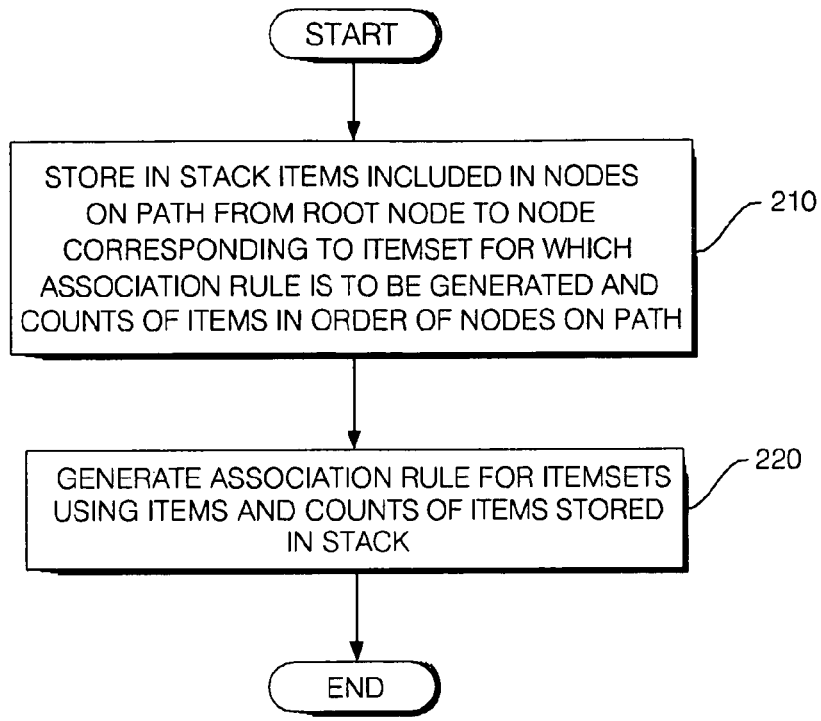
[FIG. 3]
gen_ordered_rule( $t\_stack$ )
1   $R_k = \varPhi$,
2   if ( $R_k \geq 2$ )
3      for $j$ from 1 to $top$-1 do
4         if ( $t\_stack\,[\,top\,]\,c\,/\,t\_stack\,[\,j\,].c \geq C_{min}$ )
5            $R_k = R_k\{\,t\_stack\,[\,1\,..j\,\,]\,j \Rightarrow t\_stack\,[\,j+1\,..top\,].i\,\}$;
6   return $R_k$,
GENRATION OF ORDERED ASSOCIATION RULE

[FIG. 4]
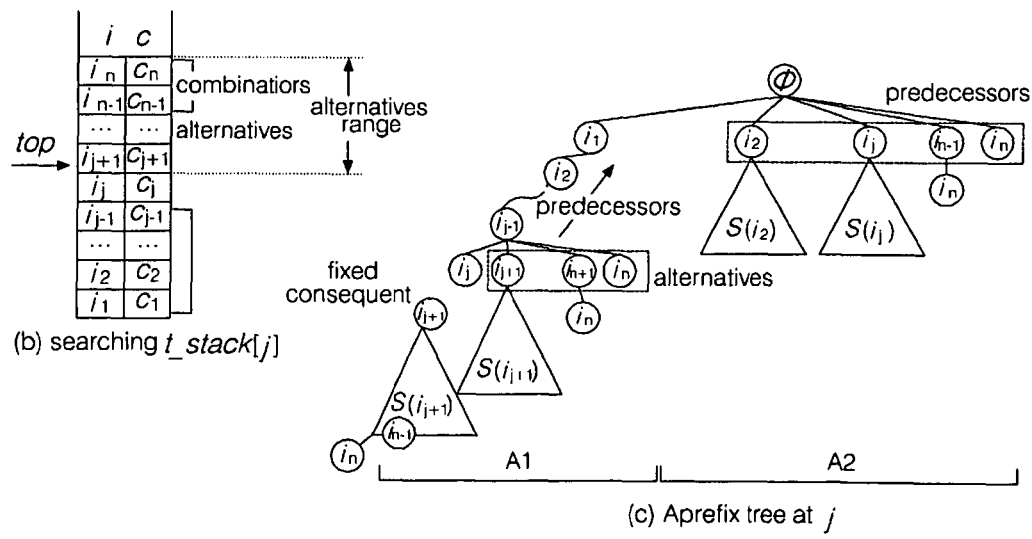
(a) An enumeration table
(b) searching $t\_stack[j]$
(c) Aprefix tree at $j$

[FIG. 5]

| | gen_disordered_rule(*t_stack*) |
|---|---|
| 1 | $R_k$ = precedetor = alternator = combinator = $\emptyset$; |
| 2 | for *j* from *top*-1 to 2 do {       /*the first set A1*/ |
| 3 |    for *k* from 1 to *j*-1 do |
| 4 |       precedetor = precedetor $\cup$ *t_stack*[*k*].*i*; |
| 5 |    for *k* from *j*+1 to *top* do { |
| 6 |       alternator = *t_stack*[*j*+1].*i*; |
| 7 |       for l from *j*+2 to *top* do |
| 8 |          combinator = combinator $\cup$ *t_stack*[*l*] |
| 9 |       *m* = search_prefix_tree(precedetor $\cup$ alternator, $P_k$) |
| 10 |       $R_k$ = $R_k$ $\cup$ search_subtree(*m*, combinator); |
| 11 |    } |
| 12 | } |
| 11 | for *j* from 2 to *top* do {       /*the second set A2*/ |
| 13 |    precedetor = *t_stack*[*k*].*i*; |
| 14 |    for *l* from *j*+1 to *top* do |
| 15 |       combinator = combinator $\cup$ *t_stack*[*l*]; |
| 16 |    *m* = search_prefix_tree(precedetor $\cup$ alternator, $P_k$) |
| 17 |    $R_k$ = $R_k$ $\cup$ search_subtree(*m*, combinator); |
| 18 | } |
| 19 | return $R_k$; |
| search_prefix_tree(*e*, $P_k$): return the node corresponding to the itemset *e* | |

GENERATION OF UNORDERED ASSOCIATION RULE

| | search_subtree (*m*, combinator) |
|---|---|
| 1 | $R_k$ = $\emptyset$; |
| 2 | if *m.i* $\subseteq$ combinator and *t_stack*[*top*].*c* / *m.$C_k$* $\geq$ $C_{min}$ |
| 3 |    $R_k$ = $R_k$ $\cup$ {$\bar{e}$ $\rightarrow$ *e* - $\bar{e}$}; |
| 4 | for each child node $m_c$ of *m* in $P_k$ do |
| 5 |    $R_k$ = $R_k$ $\cup$ search_subtree($m_c$, combinator); |
| 6 | return $R_k$; |

EXAMINATION OF SUBTREE

[FIG. 6]
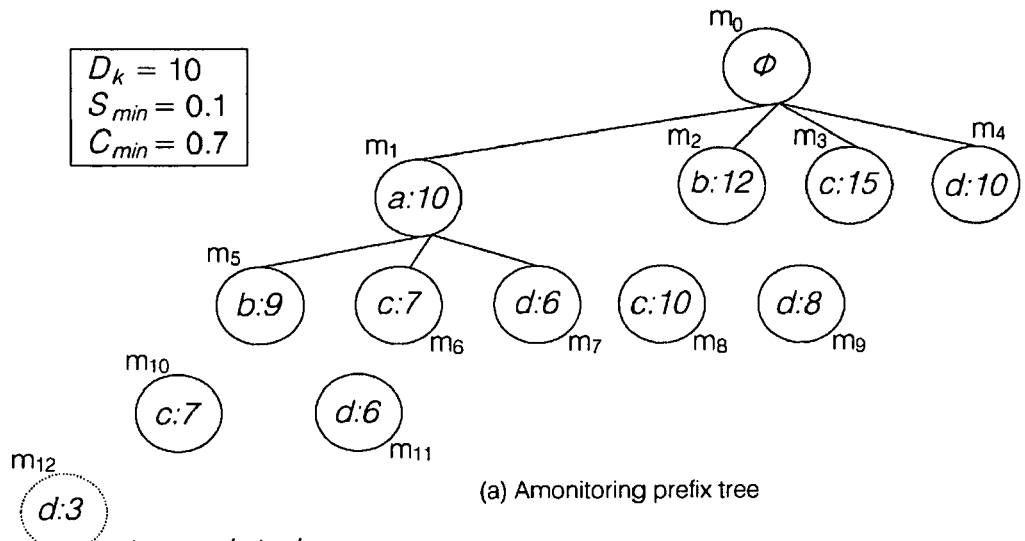
(a) Amonitoring prefix tree
| possible rules | confidence |
|---|---|
| a → bc | S(abc)/S(a) = 7/10 ≥ $C_{min}$ |
| bc → a | S(abc)/S(ab) = 7/9 ≥ $C_{min}$ |
(b) Ordered asociation rules at node $m_{10}$
| predecessors | alternatives | comvinators | consequent | possible rules | |
|---|---|---|---|---|---|
| a | c | ∅ | b | ac → b (≥$C_{min}$) | A1 |
| b | ∅ | ∅ | a | b → ac (<$C_{min}$) | |
| | | c | a | bc → a (≥$C_{min}$) | A2 |
| c | ∅ | ∅ | ab | c → ab (<$C_{min}$) | |
(c) Unordered association rules at node $m_{10}$

[FIG. 7]
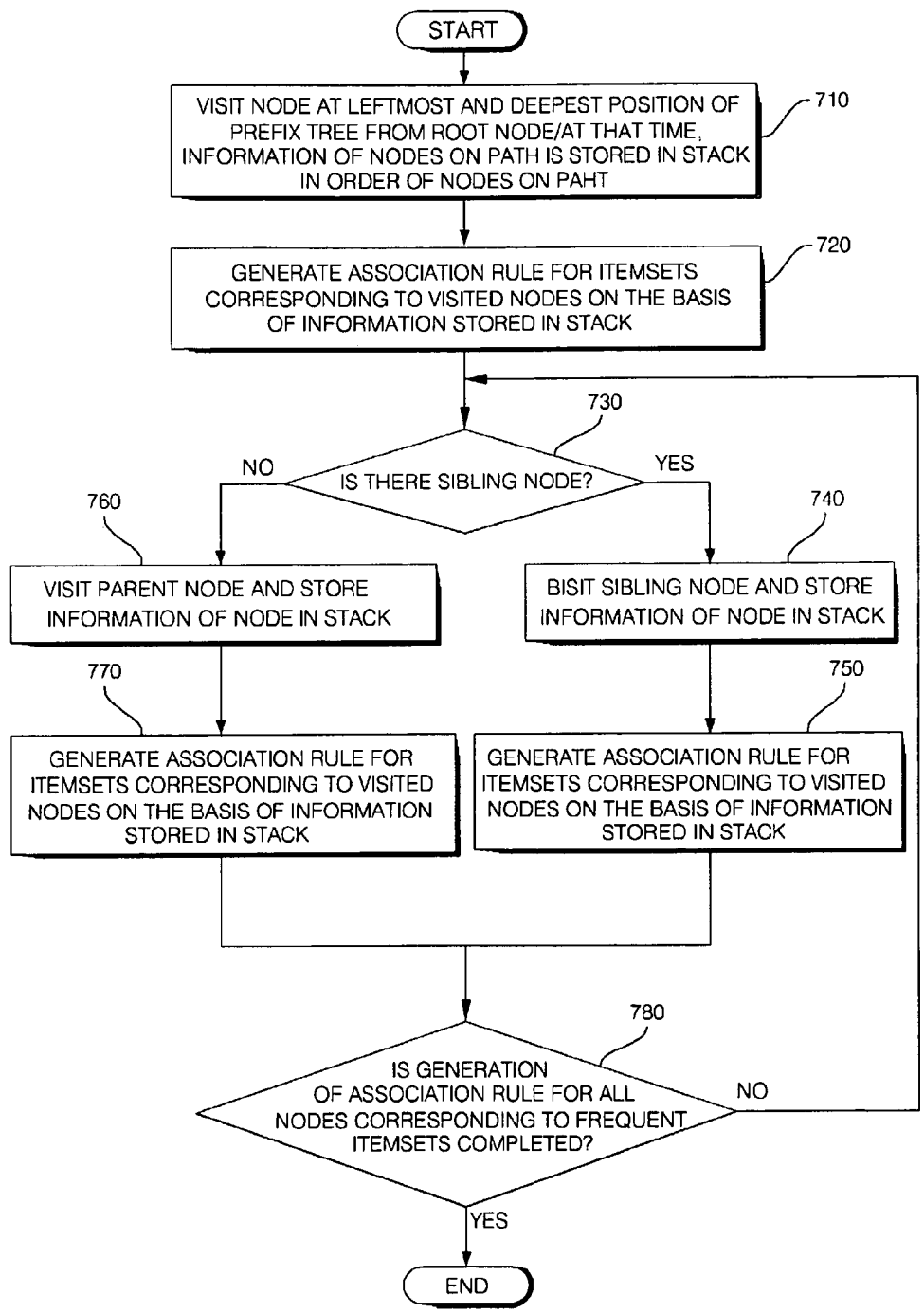

[FIG. 8]

| assoc_all($m$, $t\_stack$) |
|---|
| 1     if $m.count / |D_k| < S_{sig}$ |
| 2        return *null*; |
| 3        $t\_stack[top].i = m.item$; //push $m.item$, $m.count$ into $t\_stack$ |
| 4        $t\_stack[top].c = m.count$; |
| 5     if there exist the left-most child $m_c$ of $m$ in $P_k$ |
| 6        $R_k = R_k \cup$ assoc_all ($m_c$, $t\_stack$) |
| 7     $R_k$ = gen_ordered_rules($t\_stack$); //generate ordered rules |
| //generate disordered rules |
| 8     $R_k = R_k \cup$ gen_disordered_rule($t\_stack$); |
| 9     if $\exists$ an unvisited sibling $m_s$ of $m$ in $P_k$ |
| 10       $R_k = R_k \cup$ assoc_all ($m_s$, $t\_stack$) |
| 11     return $R_k$ |

Assoc-all METHOD

[FIG. 9]

| visited node | type of rule | generated rules | Confidence |
|---|---|---|---|
| abd ($m_1$) | Disordered | ad→b | S(abd)/S(ad) = 6/6 |
| | Disordered | bd→a | S(abd)/S(bd) = 6/8 |
| ab($m_5$) | Ordered | a→b | S(ab)/S(a) = 9/10 |
| | Disordered | b→a | S(ab)/S(b) =9/12 |
| ac($m_6$) | Ordered | a→c | S(ac)/S(a) = 7/10 |
| ad($m_7$) | none of the generated rules | | |
| bc($m_8$) | Ordered | b→c | S(bc)/S(b) = 10/12 |
| bd($m_9$) | Ordered | b→d | S(bd)/S(b) = 8/12 |

[FIG. 10]

| gen_ordered_Assoc-all-anti(t_stack) |
|---|
| 1      $R_k = \emptyset$; |
| 2      if ( $top \geq 2$ ) |
| 3          for $j$ from $top$-1 to 1 do |
| 4              if ($t\_stack[top].c / t\_stack[j].c \geq C_{min}$) |
| 5                  $R_k = R_k \cup \{ t\_stack[1..j].i \rightarrow t\_stack[j+1..top].i \}$; |
| 6              else |
| 7                  break; |
| 8      return $R_k$; |

GENERATION OF UNORDERED ASSOCIATION RULE
IN ASSOC-ALL-ANTI METHOD

[FIG. 11]

| search_subtree_anti ($m$, $combinator$) |
|---|
| 1      $R_k = \emptyset$; |
| 2      if $m.i \in combinator$ |
| 3          for each child node $m_c$ of $m$ in $P_k$ do; |
| 4              $R_k = R_k \cup$ search_subtree_anti ($m_c$, $combinator$); |
| 5          if $t\_stack[top].c / m.C_k \geq C_{min}$ |
| 6              $R_k = R_k \cup \{\bar{e} \rightarrow e - \bar{e}\}$; |
| 7          else |
| 8              return $null$; |
| 9      return $R_k$; |

GENERATION OF UNORDERED ASSOCIATION RULE IN
ASSOC-ALL-ANTI METHOD

[FIG. 12]

```
assoc_x(m, t_stack, x)
1    if m.count / |D_k| < S_sig
2        return null;
3    m_x = search_prefix_tree(x, P_k)
4    if lex_order_check(m.item, x, v)
5        t_stack[top].i = m.item;
6        t_stack[top].c = m.count;
7        if contain_check(t_stack, x, y, y_stack)
8            if t_stack[top].c / m_x.C_k ≥ C_min {
9                R_k = R_k ∪ {ē → e - ē};
10               if there exist the left-most child m_c of m in P_k
11                   R_k = R_k ∪ assoc_x(m_c, t_stack)
12               }
13           }
14   if ∃ an unvisited sibling m_s of m in P_k
15       R_k = R_k ∪ assoc_x(m_s, t_stack)
16   return R_k
``` search_prefix_tree(e, $P_k$): return the node corresponding to the itemset e contain_check(t_stack, e): return the boolean value whether the itemset represented by t_stack is contained the itemset e Assoc-X METHOD

[FIG. 13]

| assoc_y($m$, $t\_stack$, $y$) |
|---|
| 1     if $m.count / |D_k| < S_{sig}$ |
| 2        return *null*; |
| 3     $m_y$ = search_prefix_tree($y$, $P_k$) |
| 4     if *lex_order_check(m.item, y*    //lexicographically order check |
| 5        $t\_stack[top].i = m.item$; |
| 6        $t\_stack[top].c = m.count$; |
| 7        if contain_check($t\_stack, y, x\_stack$) { |
| 8           $m_x$ = search_prefix_tree($x\_stack[1..x\_top].i$, $P_k$) |
| 9           if $t\_stack[top].c / m_x.C_k \geq C_{min}$ |
| 10           $R_k = R_k \cup \{\bar{e} \rightarrow e - \bar{e}\}$; |
| 11           if there exist the left-most child $m_c$ of $m$ in $P_k$ |
| 12           $R_k = R_k \cup$ assoc_y($m_c$, $t\_stack$) |
| 13        } |
| 14     } |
| 15     if $\exists$ an unvisited sibling $m_s$ of $m$ in $P_k$ |
| 16        $R_k = R_k \cup$ assoc_y($m_s$, $t\_stack$) |
| 17     return $R_k$ |

Assoc-Y METHOD

[FIG. 14]

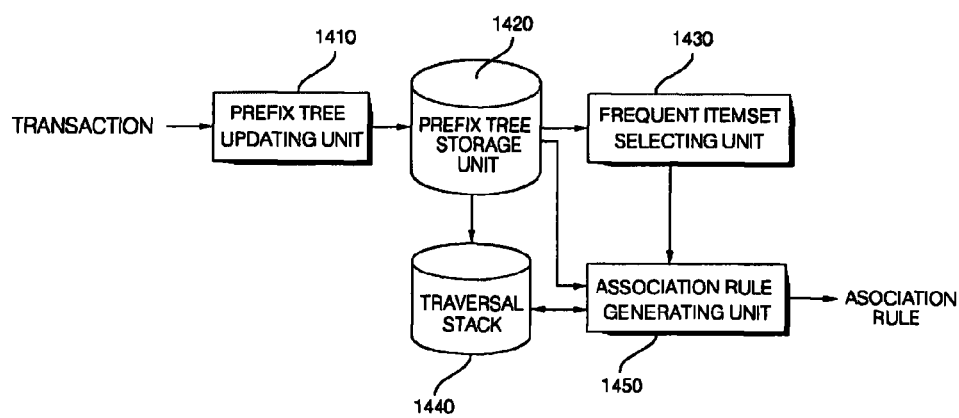

[FIG. 15]

Table 1. Data sets

| Data sets | # of items | density = { Equation.3 } |
|---|---|---|
| T3.I2.D1000K | 1000 | 0.3% |
| T5.I4.D1000K | 1000 | 0.5% |
| T10.I4.D1000K | 1000 | 1% |
| T10.I6.D1000K | 1000 | 1% |
| T15.I4.D1000K | 1000 | 1.5% |
| WebLog | 545 | 0.92% |

[FIG. 16]
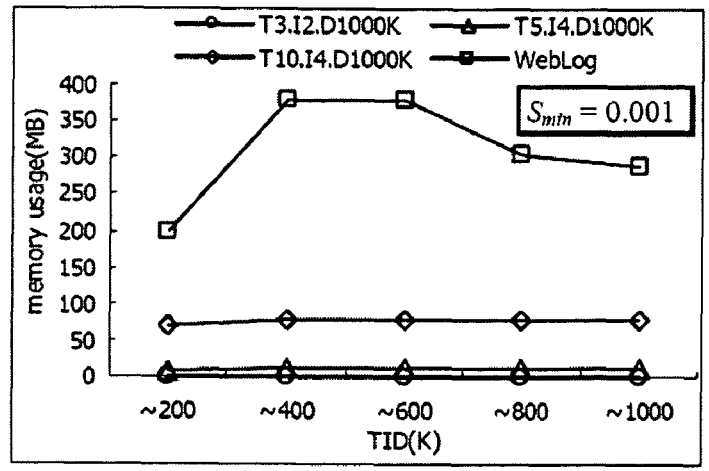
(a) Memory Usage
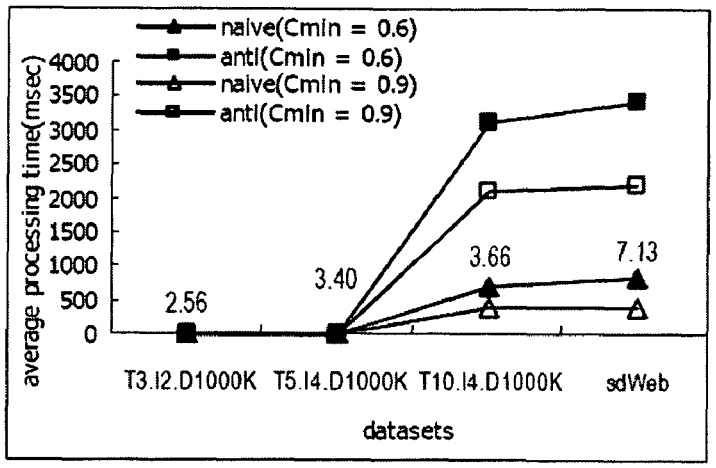
(b) Average processing time
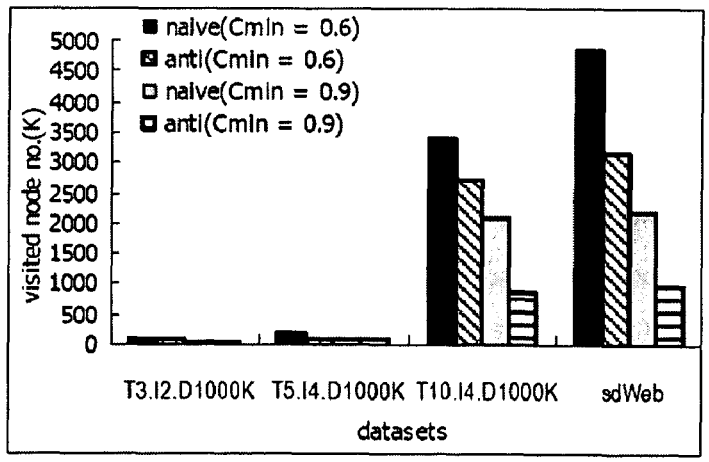
(c) Visited node number

[FIG. 17]
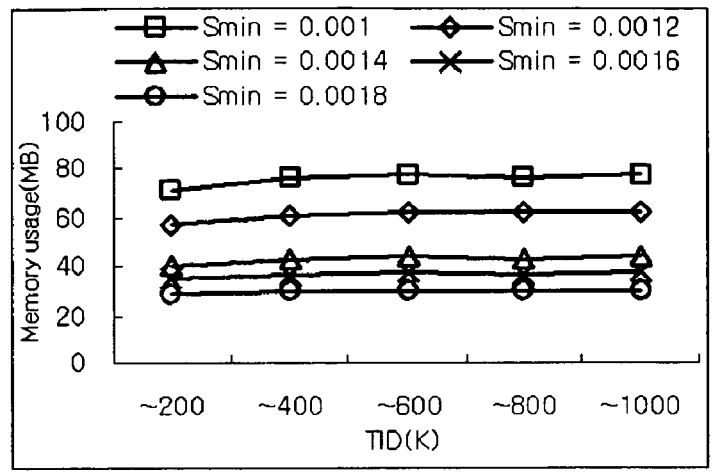
(a) Memory usage
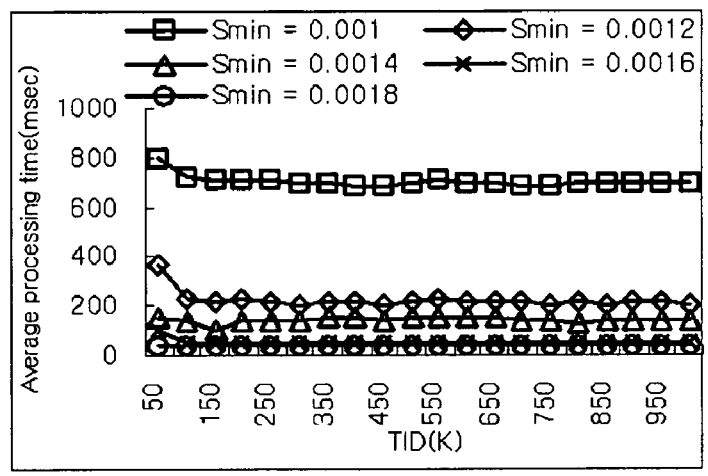
(b) Variation of average processing time
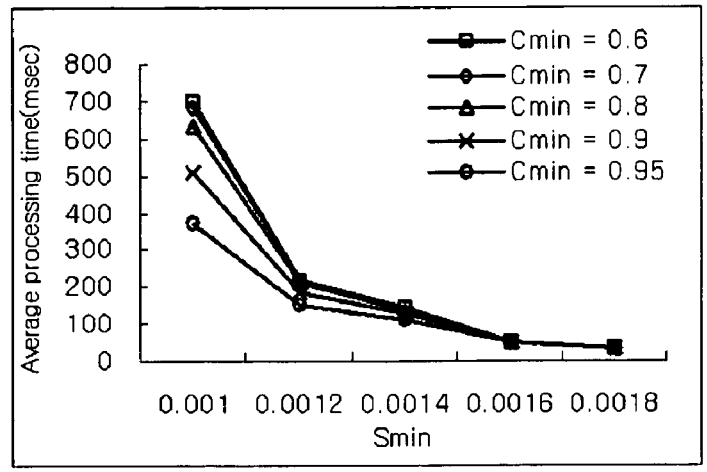
(c) Average processing time by varying

[FIG. 18]
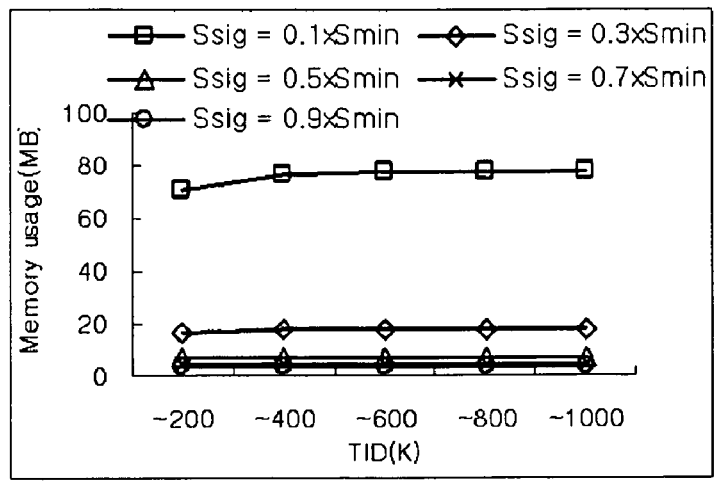
(a) Memory usage
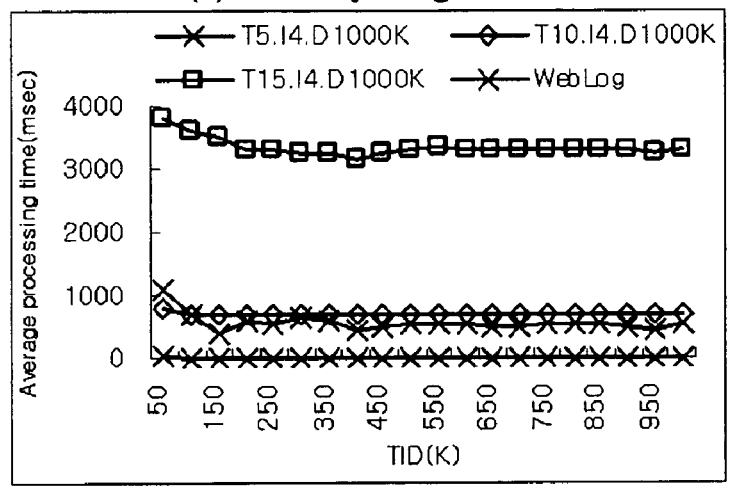
(b) Variation of average processing
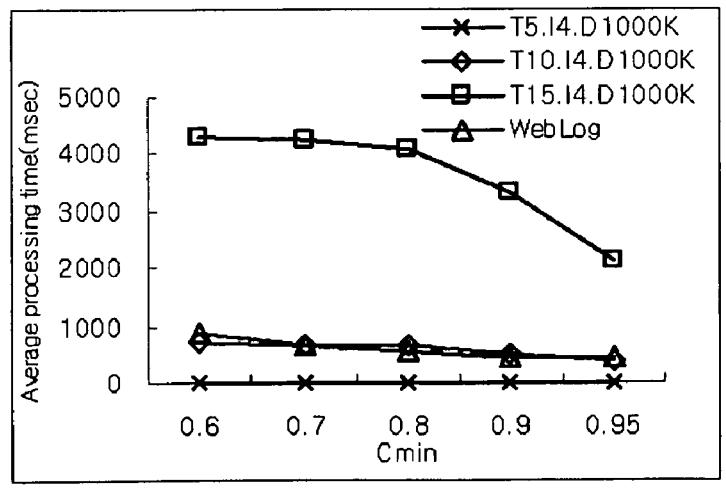
(c) Average processing time by varying

[FIG. 19]
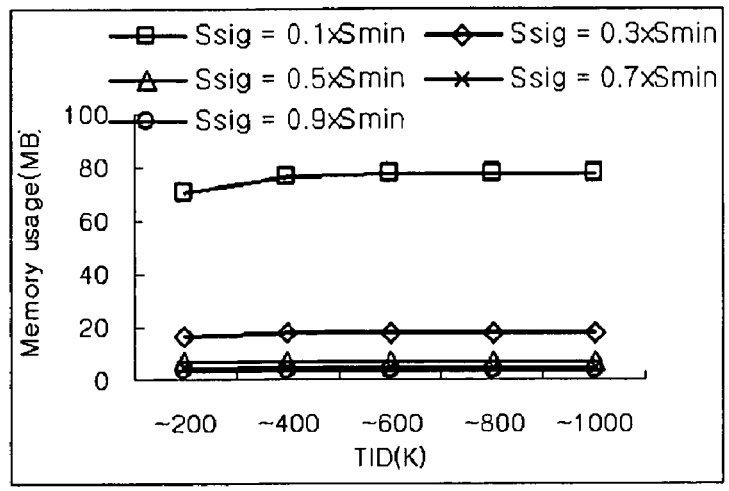
(a) Memory usage
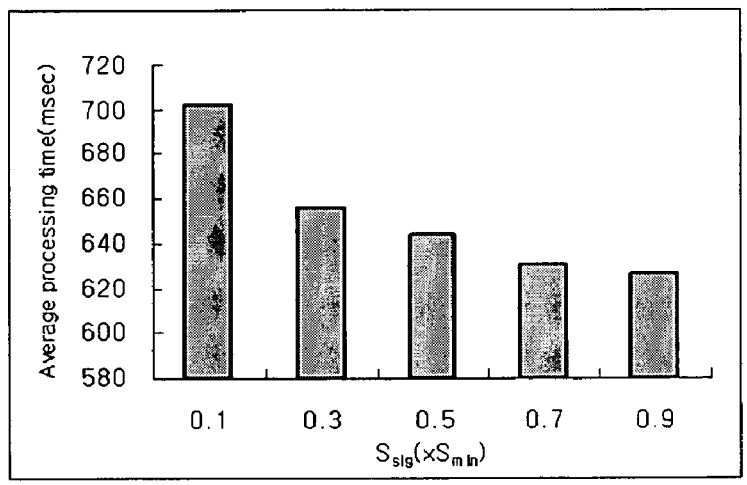
(b) Variation of average processing
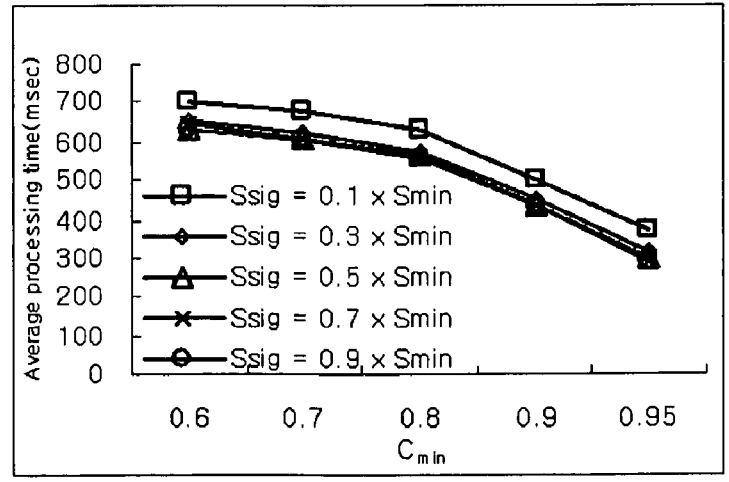
(c) Average processing time by varying

[FIG. 20]
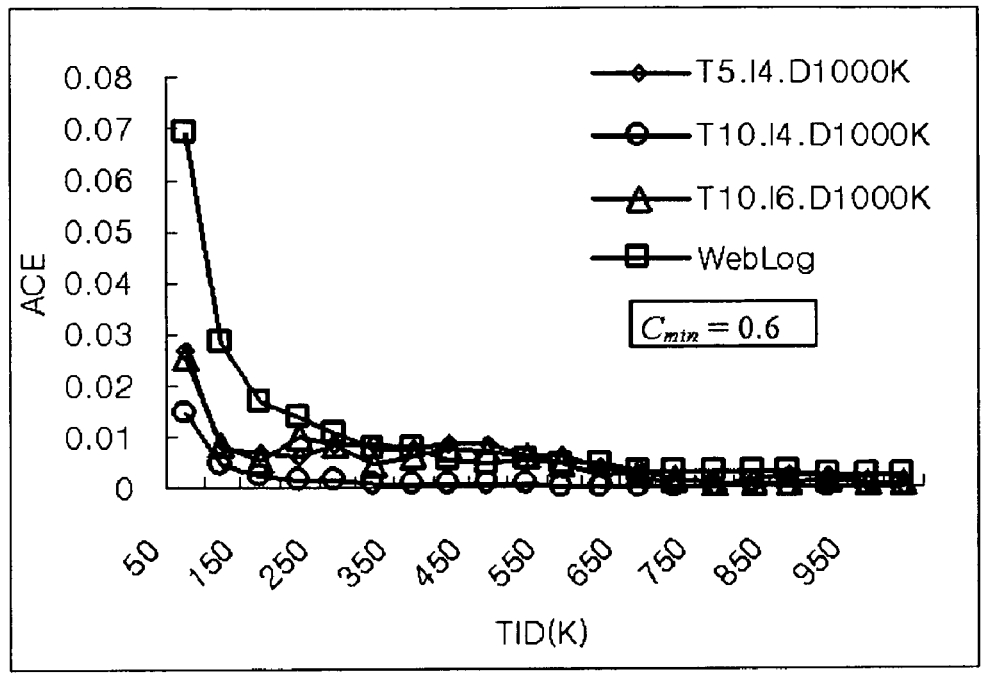
(a) Variation of *ACE*'
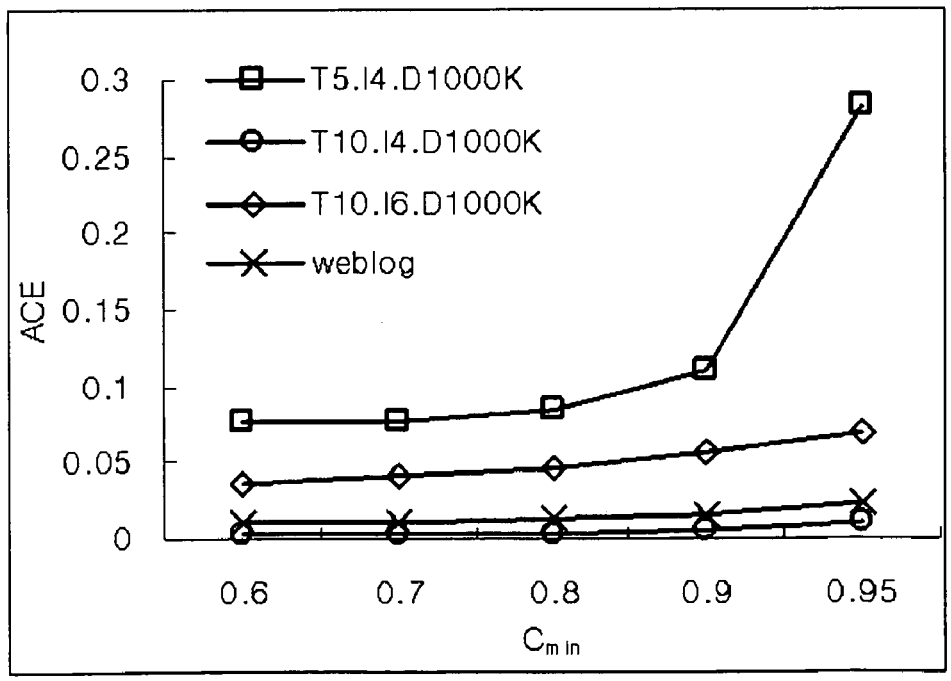
(b) *ACE*'s by varying $C_{min}$

[FIG. 21]
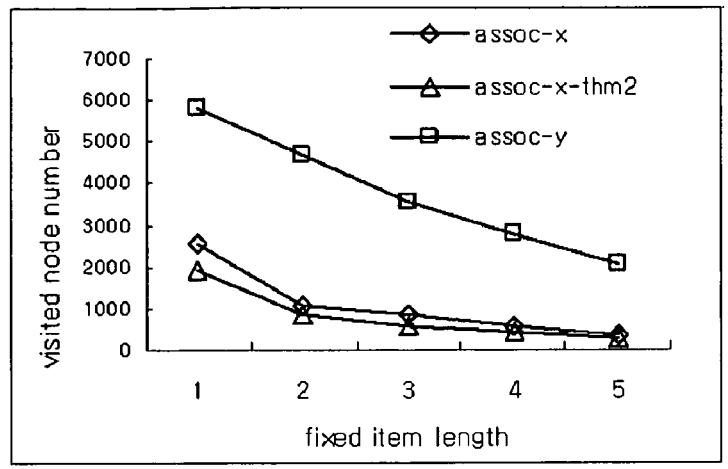
(a) Visited node number
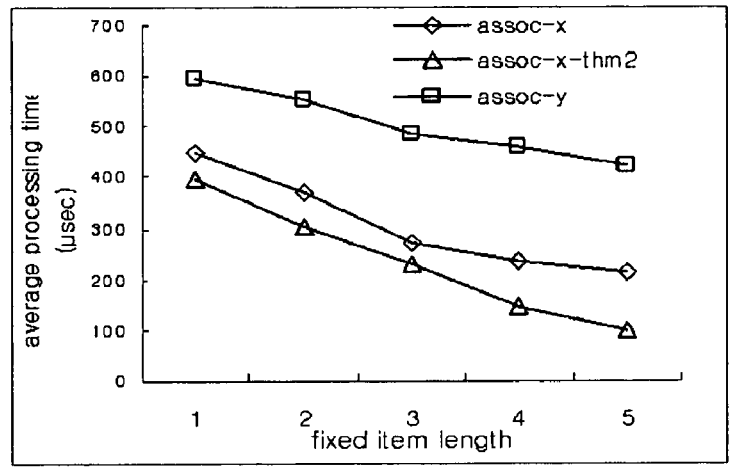
(b) Average processing time
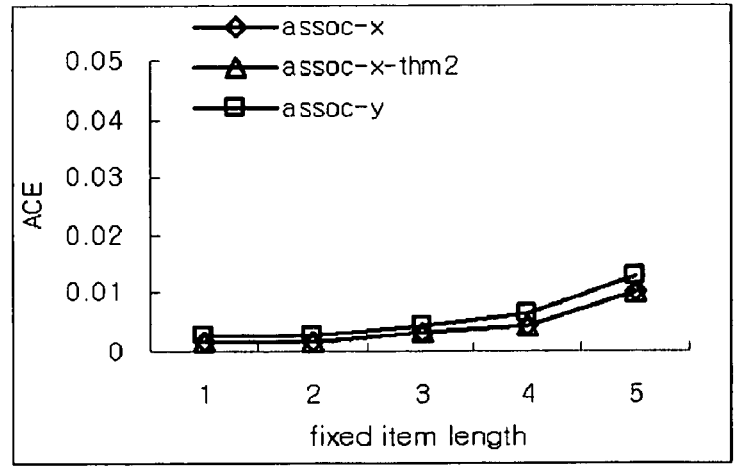
(c) Mining accuracy

COMPUTER-IMPLEMENTED METHOD OF GENERATING ASSOCIATION RULES FROM DATA STREAM AND DATA MINING SYSTEM

BACKGROUND OF THE INVENTION

1. Field of the Invention

The present invention relates to an association rule generating method and a data mining system, and more particularly, to a method of generating association rules from a data stream, which is a non-limited data set composed of transactions continuously generated and a data mining system for generating association rules from a data stream.

2. Description of the Related Art

In general, in a data set to be subjected to data mining, all the unit information items appearing in an application domain are defined as unit items, and a set of unit information items having semantic synchrony in the application domain (that is, semantically generated at the same time) is defined as a transaction. The transaction has information of unit items having semantic synchrony, and a data set to be analyzed by data mining is defined by a set of transactions generated in a corresponding application domain.

When a set I of items is given, an association rule is represented, for example, in the form of $X \rightarrow Y (X \subset I, \text{ and } Y \subset I)$. The association rule indicates the semantic relationship between the items of a data set. That is, when an itemset X appears in a transaction, the association rules predicts that another itemset Y also appears in the transaction with high probability. For a set of transactions, the support of an association rule $X \rightarrow Y$ is the fraction of transactions which contain both X and Y. The confidence of the association rule $X \rightarrow Y$ means the ratio of the number of transactions containing both X and Y to the number of transactions containing X. Two notions indicating the strength of an association rule are a minimum support $S_{min}$ and a minimum confidence $C_{min}$ and disclosed in <R. Agrawal, T. Imielinski, and A. Swami, "Mining Association Rules between Sets of Items in Very Large Databases" Proc. ACM SIGMOD Conf. Management of Data, pp. 207-216, May 1993>.

In general, when the minimum support $S_{min}$ and the minimum confidence $C_{min}$ are given, the association rule is generated through the following two steps. In the first step, all the itemsets whose supports are greater than or equal to $S_{min}$ are found. Combinations of the items are called frequent itemsets. Subsequently, in the second step, it is examined whether every non-empty proper subset of each frequent itemset can be the antecedent of an association rule. That is, for a frequent itemset e and one of its non-empty subsets q, an association rule $q \rightarrow e-q$ is generated only when $S(e)/S(q) \geq C_{min}$. The major bottleneck of this association rule mining is the first step. Therefore, most researches concentrate on devising an efficient method of finding frequent itemsets in a data set.

Apriori is a well-known algorithm for finding frequent itemsets from a finite set of transaction, which has been proposed in <R. Agrawal, T. Imielinski, and A. Swami, "Mining Association Rules between Sets of Items in Very Large Databases" Proc. ACM SIGMOD Conf. Management of Data, pp. 207-216, May 1993>. The Apriori algorithm is a multi-pass algorithm, so it needs up to n+1 scans on a data set when the maximal cardinality of a frequent itemset is n. For example, the following algorithms have been proposed to reduce the number of searches for transaction information: DIC<S. Brin, R. Motwani, J. D. Ullman, and S. Tsur. Dynamic Itemset Counting and Implication Rules for Market Basket Data. In Proceedings of the ACM SIGMOD International Conference on Management of Data, pp. 255-264, 1997>; and Partition<A. Savasers, E. Omiecinski, and S. Navathe. An Efficient Algorithm for Mining Association Rules in Large Databases. In Proceedings of the 21st International Conference on Very Large Data Bases, pp. 432-444, 1995>. In an environment in which data sets are gradually increased, it is more efficient to use one of the incremental algorithms, such as BORDERS<Y. Aumann, R. Feldman, O. Lipshtat, and H. Manilla. Borders: An efficient algorithm for association generation in dynamic databases. In Journal of Intelligent Information System, Vol. 12, No. 1, pages 61-73, 1999> and DEMON <V. Ganti, J. Gehrke, and R. Ramakrishnan. DEMON: Mining and monitoring evolving data. In Proc. of the 16th Int'l Conference on Data Engineering, pages 439-448, San Diego, Calif., February 2000>. These incremental algorithms focus on efficiently utilizing the previous mining result of a data set in finding the up-to-date mining result. However, since the above algorithms need to search a large number of data sets and to manage each transaction information item, they are not suitable to search the frequent itemsets of a data stream.

For the second step of association rule mining, an online mining algorithm is proposed in <Charu C. Aggarwal, Philip S. Yu: A New Approach to Online Generation of Association Rules. IEEE Trans. Knowl. Data Eng. 13(4): 527-540, 2001>. Typically, a user is interested in only a few association rules and needs to run a query multiple times in order to find appropriate levels of $S_{min}$ and $C_{min}$. A directed acyclic graph, called an adjacency lattice, is composed of a set of all frequent itemsets in order to avoid redundancy. An approach similar to OLAP (online analytical processing) is employed for the on-line mining of association rules. However, these approaches for a finite set of transactions need to manage each transaction information item and to scan the data sets multiple times. Therefore, they are not suitable for finding frequent itemsets of a data stream.

A data stream is defined as an infinite set of data that is continuously generated at a rapid rate. Therefore, it is difficult to store all the elements in a separated limited space. Considering this characteristic, in order to extract knowledge for data stream information, the following requirements should be satisfied. First, the mining result should be generated with only one read of each transaction information item of the data stream. Second, a memory space for data stream analysis should be restricted finitely although new data elements are continuously generated in a data stream. Third, newly generated data elements should be processed as fast as possible. Finally, the up-to-date analysis result of a data stream should be provided instantly upon request. To satisfy these requirements, generally, data stream mining methods sacrifice the correctness of its analysis by allowing some errors.

Recently, various algorithms have been actively proposed to find semantic knowledge from a data stream. Among these algorithms, the sticky sampling method and the Lossy Counting algorithm (see G. S. Manku and R. Motwani. Approximate Frequency Counts over Data Streams. In Proc. of the 28th VLDB, pp. 346-357, 2002) and an estDec method (J. H. Chang and W. S. Lee. Finding recent frequent itemsets adaptively over online data streams. In Proc. of the 9th ACM SIGKDD, pp. 487-492, 2003) focus on finding frequent itemsets in a data stream. The Lossy Counting algorithm is a representative algorithm following a deterministic method, and finds a set of frequent itemsets generated from a data set when a minimum support and a maximum allowable error condition are given. The Lossy Counting algorithm manages the counts of possible frequent itemsets generated in each transaction forming the data stream and the errors thereof in a memory, and stores transactions newly generated in a buffer having a fixed size in the main memory. The stored transactions are batch-processed together. For the transactions stored in the buffer, the count of each unit item is updated, all the possible candidate items are generated from the transactions stored in the buffer, and the counts of the items are updated. For new possible frequent items, a maximum error that can be included in the corresponding item is estimated in consideration of the number of transactions generated previously, and the frequent items are managed together.

In this algorithm, the number of transactions that can be batch-processed is proportional to the size of the buffer. Therefore, as the size of the buffer increases, processing efficiency increases. However, consequently, a memory space required to search the frequent itemsets is also increased. In addition, in order to update the count of the itemset or obtain the mining result, all the itemsets managed in a secondary storage unit should be searched, which may result in long mining time. Therefore, this algorithm is not suitable for mining in an on-line data stream environment that can frequently obtain the mining result at any time.

The estDec method has been proposed to sufficiently minimize the number of itemsets to be monitored for finding frequent itemsets over an online data stream while searching the frequent itemsets.

In the estDec method, an itemset is regarded as a significant itemset if its current support is greater than or equal to a predetermined threshold value $S_{sig}$ ($S_{sig}<S_{min}$). A prefix tree structure is employed to trace the current count of every significant itemset in the memory. Each significant itemset is represented by a node of the prefix tree. The total number of itemsets monitored in the memory is minimized by two major operations: delayed-insertion and pruning. The delayed-insertion delays the insertion of a new itemset in new transactions until the itemset becomes significant enough to be monitored. The pruning prunes the monitored itemset when the itemset turns out to be insignificant.

As disclosed in Ahmed Metwally, Divyakant Agrawal, Amr El Abbadi. Using Association Rules for Fraud Detection in Web Advertising Network. In Proc. of the 31st international conference on Very large data bases, August 2005, a simplified association rule between two items over a data stream is introduced for fraud detection in web advertising networks. To define an association rule x→y between two items x and y, their conditional frequency is continuously monitored over a data stream. This means the occurrence count of a pair (x, y), that is, the occurrence count when the item x is followed by the item y within a predetermined max span δ. A unique-count technique has been proposed to count the conditional frequencies of all the distinct pairs of items efficiently over a data stream. To the best of our knowledge, a general algorithm for generating association rules over a data stream has not been addressed before. A conventional two-step approach has been applied to an online data stream in order to frequently generate all the association rules at any time after all the up-to-date frequent itemsets are extracted. This approach requires an additional memory space for temporarily storing information on the supports of all the frequent itemsets. Furthermore, it is not efficient to trace the on-going changes of association rules over an on-line data stream.

SUMMARY OF THE INVENTION

An object of the invention is to provide a method of generating association rules from a data stream, which is a non-limited data set composed of transactions generated continuously and a data mining system for generating association rules from a data stream.

In order to achieve the object, according to an aspect of the invention, there is provided a method of generating association rules from a data stream, which is a non-limited data set composed of transactions continuously generated. The method includes: when itemsets included in the generated transactions and the counts of the itemsets are managed using a prefix tree and each node of the prefix tree has information on the count of a specific itemset corresponding to the node and a specific item, updating the information of a node corresponding to the itemset or adding a new node on the basis of the itemset included in the generated transaction and the count of the itemset; comparing the support of the itemset corresponding to each of the nodes of the prefix tree with a minimum support, which is a predetermined threshold value, to select frequent itemsets; and visiting all or some of the nodes corresponding to the selected frequent itemsets, and generating the association rule on the basis of the information of each of the visited nodes.

The generating of the association rule may include: storing, in a stack, items included in each of the nodes on a path from a root node to a node corresponding to an itemset for which an association rule is to be generated, and the counts of the items in the order of the nodes on the path; and generating the association rule for the itemset using the items and the counts of the items stored in the stack.

When the items included in the itemset are lexicographically arranged, the generating of the association rule for the itemset may include: generating an ordered association rule in which all the items included in its antecedent precede lexicographically to the most preceding one of the items included in its consequent; and generating an unordered association rule other than the ordered association rule among the association rules for the itemset.

In the generating of the association rule, the nodes may be visited by a pre-order depth-first manner, and the association rule for the itemset corresponding to each of the visited nodes may be generated.

The generating of the association rule may include: storing, in a stack, information of each of the nodes on a path from a root node to an arbitrary node in the order of the nodes on the path; generating an association rule for an itemset corresponding to the arbitrary node using the information stored in the stack; deleting information on an item corresponding to the arbitrary node and the count of the item, which is stored in the uppermost layer of the stack, visiting a sibling node or a parent node of the arbitrary node, and storing information of the visited sibling node or parent node in the stack; and generating an association rule for an itemset corresponding to the sibling node or the parent node using the information stored in the stack.

In the generating of the association rule for the itemset corresponding to the arbitrary node or the generating of the association rule for the itemset corresponding to the sibling node or the parent node, the confidence of an association rule having all sub-itemsets of the itemset in its antecedent may be calculated, and the calculated confidence may be compared with the minimum confidence, which is a predetermined threshold value, to generate the association rule.

In the generating of the association rule for the itemset corresponding to the arbitrary node or the generating of the association rule for the itemset corresponding to the sibling node or the parent node, the confidence of an association rule having at least some of the sub-itemsets of the itemset in its antecedent may be examined to generate the association rule. When the confidence of an association rule having any one of the sub-itemsets of the itemset in its antecedent is smaller than the minimum confidence, which is the predetermined threshold value, the confidence of an association rule having a subset of the sub-itemset in its antecedent may not be examined.

In the generating of the association rule, when an association rule having a specific itemset X in its antecedent is generated, the association rule may be generated by a pre-order traversal while visiting each of the nodes corresponding to supersets of the specific itemset X. When an association rule X→e−X for any one of the visited nodes (e is an itemset corresponding to the visited node) is not established, descendant nodes of the visited node may not be visited.

In the generating of the association rule, when an association rule having a specific itemset Y in its consequent is generated, the association rule may be generated by a pre-order traversal while visiting each of the nodes corresponding to supersets of the specific itemset Y. When an association rule e−Y→Y for any one of the visited nodes (e is an itemset corresponding to the visited node) is not established, descendant nodes of the visited node may not be visited.

According to another aspect of the invention, there is provided a data mining system for generating association rules from a data stream, which is a non-limited data set composed of transactions continuously generated. The system includes: a prefix tree storage unit that manages itemsets included in the generated transactions and the counts of the itemsets using a prefix tree and stores the prefix tree in which each node has information on the count of a specific itemset corresponding to the node and a specific item; a prefix tree updating unit that updates the information of a node corresponding to the itemset or adds a new node on the basis of the itemset included in the generated transaction and the count of the itemset; a frequent itemset selecting unit that compares the support of the itemset corresponding to each of the nodes of the prefix tree with a minimum support, which is a predetermined threshold value, to select frequent itemsets; and an association rule generating unit that visits all or some of the nodes corresponding to the selected frequent itemsets, and generates an association rule on the basis of the information of each of the visited nodes.

The data mining system may further include: a stack that stores items included in each of the nodes on a path from a root node to a node corresponding to an itemset for which an association rule is to be generated, and the counts of the items in the order of the nodes on the path. The association rule generating unit may generate the association rule for the itemset using the items and the counts of the items stored in the stack.

When the items included in the itemset are lexicographically arranged, the association rule generating unit may generate an ordered association rule in which all the items included in its antecedent precede lexicographically to the most preceding one of the items included in its consequent, and generate an unordered association rule other than the ordered association rule among the association rules for the itemset.

According to still another aspect of the invention, there is provided a computer readable recording medium that includes code for allowing a computer to execute a method of generating association rules from a data stream, which is a non-limited data set composed of transactions generated continuously.

According to the invention, it is possible to effectively generate association rules from a data stream, which is a non-limited data set composed of transactions continuously generated.

BRIEF DESCRIPTION OF THE DRAWINGS

FIG. 1 is a flowchart illustrating the overall flow of a method of generating association rules according to an embodiment of the invention;

FIG. 2 is a flowchart illustrating a method of generating association rules for an arbitrary frequent itemset according to an embodiment of the invention;

FIG. 3 is a diagram illustrating the algorithm of a method of generating all unordered association rules for an arbitrary frequent itemset e using a traversal stack;

FIG. 4 is a diagram illustrating a process of generating an unordered association rule according to an embodiment of the invention;

FIG. 5 is a diagram illustrating the algorithm of a method of generating all unordered association rules for an arbitrary frequent itemset e using a traversal stack;

FIG. 6 is a diagram illustrating an example of a process of generating all association rules from a 3-itemset abc according to an embodiment of the invention;

FIG. 7 is a flowchart illustrating a method of generating all the current valid association rules for all the frequent itemsets of a prefix tree according to an embodiment of the invention;

FIG. 8 is a diagram illustrating the algorithm of a method of generating all the current valid association rules for all the frequent itemsets of a prefix tree;

FIG. 9 is a diagram illustrating the association rules generated from the prefix tree shown in FIG. 6;

FIG. 10 is a diagram illustrating the algorithm of a method of generating an ordered association rule in an Assoc-all-anti method;

FIG. 11 is a diagram illustrating the algorithm of a method of generating all unordered association rules from an itemset e in the Assoc-all-anti method;

FIG. 12 is a diagram illustrating the algorithm of a method of generating all association rules each having a specific itemset in its antecedent according to an embodiment of the invention;

FIG. 13 is a diagram illustrating the algorithm of a method of generating all association rules each having a specific itemset in its consequent according to an embodiment of the invention;

FIG. 14 is a block diagram illustrating a data mining system for generating association rules according to an embodiment of the invention;

FIG. 15 is a diagram illustrating data sets for verifying the performance of an association rule generating method according to an embodiment of the invention;

FIGS. 16A to 16C are graphs illustrating the results of the comparison between the performances of an Assoc-all-anti method and an Assoc-all method for four data sets;

FIGS. 17A to 17C are graphs illustrating the performance of the Assoc-all method using a data set T10.I4.D1000K;

FIGS. 18A to 18C are graphs illustrating the results of experiments that are conducted on three data sets having the same value of |I| in order to measure the effect of the data sets on transaction density;

FIGS. 19A to 19C are graphs illustrating the evaluation of the performance of the Assoc-all method according to a variation in $S_{sig}$ with respect to $S_{min}$, which is a fixed value;

FIGS. 20A and 20B are graphs illustrating the relative accuracies of association rule generating methods proposed in the invention; and FIGS. 21A to 21C are graphs illustrating the performances of an Assoc-X method and an Assoc-Y method using a data set T10.I4.D1000K.

DESCRIPTION OF THE PREFERRED EMBODIMENTS

Exemplary embodiments of the present invention will now be described in detail with reference to the accompanying drawings. In the following description, a detailed description of known functions and configurations incorporated herein will be omitted for conciseness and clarity.

Before the description of the invention, first, symbols used in the invention are defined.

A data stream for mining frequent itemsets is an infinite set of continuously generated transactions, and can be defined as follows:

i) $I=\{i_1, i_2, \ldots, i_n\}$ is a set of items that have ever been used as unit information in an application domain;

ii) When $2^I$, is the power set of I and $e \in (2^I - \{\emptyset\})$ is satisfied, e is called an itemset. The length $|e|$ of the itemset indicates the number of items forming the itemset e, and an arbitrary itemset e is defined as an $|e|$-itemset depending on the length of the corresponding itemset. In general, a 3-itemset $\{a,b,c\}$ is simply represented by abc;

iii) A transaction is a subset of I, which is a non-empty subset, and each transaction has a transaction identifier TID. A k-th transaction added to a data set is represented by $T_k$, and the TID of $T_k$ is K; and iv) When a new transaction $T_k$ is added, a current data set $D_k$ includes all transactions that have been added, that is, $D_k = <T_1, T_2, \ldots, T_k>$. Therefore, $|D_k|$ means the total number of transactions in the current data set $D_k$.

Next, an estDec method that searches a frequent itemset from an on-line data stream according to an embodiment of the invention will be described.

Information included in a data stream is changed with time. Identifying a change of information in a data stream quickly can provide valuable information for the analysis of the data stream. For this purpose, the effect of obsolete information in old transactions on the current mining result of a data stream should be eliminated effectively. A decay-rate method is used to solve these problems. A decay-rate indicates the degree of decay of a weight according to a predetermined variation in an information differentiation method that differentiates the importance of the latest information from the importance of the past information in a data set generated with time, and is defined by the following factors, that is, a decay-base b and a decay-base-life h. The decay-base is a base value that defines the decay-rate, and the decay-base life means a unit time elapsed until a weight value (=1) of the current transaction is reduced to b−1 in the data set. Meanwhile, the decay-rate d that indicates the degree of decay of a weight value according to a variation in unit time when the decay-base b and the decay-base-lift h are given is defined as follows. When the decay-rate d is defined, actual decay information generated according to a time variation is calculated by (1−d):

$$d = b^{-(1/h)} (b \geq 1, h \geq 1).$$

The estDec method proposed to search a frequent itemset in an on-line data stream processes transactions in a data stream at the same time of generation thereof, and manages the frequency of itemsets appearing in the transactions using a monitoring tree whose structure is a prefix tree, without generating any candidate for generating frequent itemsets. In the given current data stream $D_k$, a prefix tree $P_k$ has the following characteristics:

i) a prefix tree Pk has a root node $n_{root}$ with a "null" value and other nodes except for the root node $n_{root}$ each has an item $i \in I$; and ii) as for an arbitrary node n having the item $i_n \in I$ in a given prefix tree $P_k$, assuming that nodes existing on a path from the root node to a node n are arranged in the order of $n_{root} \to n_1 \to n_2 \to \ldots, n_v \to n$ and a node $n_j$ on the path has an item $i_j \in I$ ($1 \leq j \leq v$), the node n represents an itemset $en = i_1 i_2 \ldots, i_v i_n$ and maintains the current count $C_k(e)$ of the itemset en.

For a given decay-rate d, the count $C_k(e)$ of an itemset e in the current data $D_k$ is defined as follows:

$C_k(e) = C_{k-1}(e) \times d + 1$ if e appears in a new transaction $T_k$; and $C_k(e) = C_{k-1}(e) \times d$ if e does not appear in a new transaction $T_k$.

Whenever a new transaction $T_k$ is generated, all the nodes that are matched with the itemsets appearing in the transaction $T_k$ are visited, and the count of each itemset is updated. In order to reduce the number of itemsets whose number of appearances will be managed as small as it can be managed on a memory while searching frequent itemsets from the on-line data stream, the estDec method manages only the itemsets that are likely to become frequent itemsets through delayed-insertion and pruning. In order to perform the two processes, the following two predetermined support threshold values, that is, a delayed-insertion threshold value $S_{ins}$ ($\leq S_{min}$) and a pruning threshold value $S_{prn}$ ($\leq S_{ins}$) are used. An itemset having a support that is larger than the delayed-insertion threshold value $S_{ins}$ is regarded as a significant itemset, and only the significant itemsets are managed on the memory. In the estDec method, a new itemset appearing in the data stream $D_k$ and the count of the itemset are managed on the memory in the following two cases. First, a new 1-itemset appearing in a newly generated transaction $T_k$ and the count of the itemset are inserted into the prefix tree $P_k$ without estimating the count. Second, when a new n-itemset (n≥2) that is not managed in the prefix tree is generated in the transaction $T_k$ and the n-itemset has a sufficiently large support to be a frequent itemset in the near future, the itemset is inserted into the prefix tree $P_k$. That is, the support of a new n-itemset e (n≥2) that is not managed in the prefix tree $P_k$ is estimated from the count of (n−1)-sub-itemsets thereof, when the (n−1)-sub-itemsets of the n-itemset e are managed in the prefix tree $P_k$. When the estimated value is larger than a predetermined delayed-insertion threshold value $S_{ins}$, the itemset is inserted into the prefix tree $P_k$.

For two arbitrary items appearing in a dataset including a plurality of transactions, the two items appear together in a maximum number of transactions, the two items are least exclusively distributed (LED). In contrast, when the two items appear most exclusively, the two items are most exclusively distributed (MED). The maximum count $C_{max}(e_1 \cup e_2)$ of a union-itemset $e_1 \cup e_2$ of two items e1 and e2 is estimated assuming that the two items are in the LED state:

$C_{max}(e_1 \cup e_2) = \min(C(e_1), C(e_2))$ (where C(x) indicates the count of an itemset x).

The minimum count $C_{min}(e_1 \cup e_2)$ of a union-itemset $e_1 \cap e_2$ ($e_1 \cap e_2 \emptyset$) of the two items $e_1$ and $e_2$ is estimated assuming that the two items are in the MED state:

$C_{min}(e_1 \cup e_2) = \max(0, C(e_1) + C(e_2) - C(e_1 \cap e_2))$.

When the current count of the (n−1)-sub-itemsets of an n-itemset e is $\{c_1, c_2, \ldots, c_n\}$, the estimated current count $\hat{C}(e)$ of the itemset is a minimum value of the count of all the (n−1)-sub-itemsets ($\hat{C}_k(e) = \min(c_1, \ldots, c_n)$), and the upper bound of the estimation error for e is as follows:

$|C_k(e) - \hat{C}_k(e)| = \max(c_1, \ldots, c_n) - \min(c_1, \ldots, c_n)$.

The above procedure is a delayed-insertion operation, and the upper bound of this estimation error decreases as the value k increases.

In contrast, a pruning operation is performed when the current support of an itemset maintained by $P_k$ becomes less than a predetermined pruning threshold value $S_{prn}$. The itemset is regarded as an insignificant itemset that is less likely to be a frequent itemset in the near future. The node representing such an itemset and all of its descendent nodes are pruned from $P_k$ on the basis of the anti-monotonicity of a frequent itemset.

The estDec method is composed of four phases: a parameter updating phase, a count updating phase, an itemset insertion phase, and a frequent itemset selection phase. Whenever a new transaction is inserted into a current data stream in a mining process, these phases except the frequent itemset selection phase are performed in sequence. The total number of transactions in the current data stream $|D_k|$ is updated in the parameter updating phase. In the count updating phase, the counts of itemsets managed in a monitoring lattice among the itemsets that appear in a new transaction are updated. After all the itemsets induced by the new transaction are updated, the itemset insertion phase is performed to search itemsets that are likely to be frequent itemsets in the near future from the itemsets that newly appear. The frequent itemset selection phase is performed only when the mining result of the current data stream is required.

FIG. 1 is a flowchart illustrating the overall flow of a method of generating association rules according to an embodiment of the invention.

In Step 110, an application domain reads transaction data that is newly generated.

In Step 120, basic information required for mining, such as the total number of transactions and threshold values for the insertion of itemsets and the pruning operation, is updated.

In Step 130, on the basis of the itemsets included in a generated transaction and the count of itemsets, information included in a node corresponding to the itemset, that is, the count of the corresponding itemset, is updated, or a new node is added. In this case, the new node may be added by the delayed-insertion in the estDec method, as described above. In Step 130, the pruning operation may be performed together with the update of the count of the itemset, as described above.

Meanwhile, although not shown in FIG. 1, a forced pruning operation may be performed periodically or in a special case, if necessary. The itemset that has ever appeared but does not appear again has a very low support, but it may be maintained without being removed from the prefix tree. That is, when unnecessary itemsets that are removable exist in the prefix tree, a memory is wasted in the mining process. Therefore, in order to minimize the waste of the memory, it is possible to search all the itemsets included in the prefix tree and remove a prunable itemset from the prefix tree, which is called a forced pruning operation. When the forced pruning operation is performed, the itemsets larger than the pruning threshold value are maintained in the prefix tree, and thus it is possible to minimize the amount of use of the memory. However, since the forced pruning operation needs to search the entire prefix tree, it requires a lot of time. Therefore, the forced pruning operation is periodically performed at a predetermined time interval or in a special case, such as a shortage of memory capacity.

Steps 110 to 130 are repeated whenever a transaction occurs in the application domain.

In Step 135, when it is requested to select a frequent itemset, the process proceeds to Step 140. The selection request of the frequent itemset is made when the mining result of the current data stream is required.

In Step 140, the support of an itemset corresponding to each node of the prefix tree is compared with a minimum support, which is a predetermined threshold value, to select the frequent itemsets. Specifically, each node of the prefix tree is searched, and the itemset corresponding to the node is determined as the frequent itemset only when the support of the itemset is greater than the minimum support.

In Step 145, when it is requested to generate an association rule, the process proceeds to Step 150. Similar to the selection request of the frequent itemset, the request to generate the association rule is made when the mining result of the current data stream is required.

In Step 150, some or all of the nodes corresponding to the selected frequent itemsets are visited, and the association rule is generated on the basis of information included in the visited nodes, that is, the itemsets represented by the nodes and the count of each itemset.

Next, Step 150 will be described in more detail. In addition, a method of generating association rules of an arbitrary frequent itemset, a method of generating all associating rules valid for all the frequent itemsets in the prefix tree, a method of generating all association rules in the antecedent of a specific itemset, and a method of generating all association rules in the consequent of a specific itemset Y will be described.

FIG. 2 is a flowchart illustrating a method of generating association rules of an arbitrary frequent itemset according to an embodiment of the invention.

In Step 210, itemsets included in the nodes on a path from the root node to a node corresponding to an itemset whose association rule will be generated and the count of the itemset are sequentially stored in a stack. Since information is stored in the stack while traversing the nodes, the stack is referred to as a traversal stack in the specification.

In Step 220, an association rule of the itemset is generated on the basis of the itemset stored in the traversal stack and the count of the itemset.

Next, Steps 210 and 220 will be described in more detail.

In a given frequent n-itemset, a maximum of $2^n-2$ association rules can possibly be generated. This is because all sub-itemsets of a frequent n-itemset except for an empty set can form the antecedent of each association rule. For example, 6 different association rules can possibly be generated from a frequent itemset abc as follows: a→bc, ab→c, ac→b, b→ac, bc→a, and c→b. In this embodiment, association rules can be categorized by two different types, namely, ordered and unordered association rules as defined in Definition 1. For example, according to the lexicographical order of items, an association rule ac→de is an ordered association rule while ad→ce is an unordered association rule. For a frequent n-itemset, a maximum of n−1 different ordered association rules can be generated.

Definition 1. Ordered/Unordered Association Rules

For a frequent itemset $e \subset I$, let q be a sub-itemset of e, not an empty set of e. Given the lexicographical order of items in I, an association rule q→e−q is defined as an ordered association rule if all the items of q precede lexicographically to the most preceding item in e−q. Among the association rules of the itemset e, association rules other than the ordered association rule are defined as unordered rules.

In the estDec method, all the frequent itemsets in an on-line data stream are continuously monitored by a prefix tree. In order to find out whether a currently frequent itemset in the prefix tree can generate any association rule, the current supports of all the non-empty proper sub-itemsets of each of the frequent itemsets are required to compute the confidence of each of the ordered and unordered association rules. Therefore, the nodes corresponding to the sub-itemsets in the prefix tree need to be visited. A traversal stack defined by Definition 2 is employed to make all the ordered and unordered association rules of a frequent itemset.

Definition 2. A Traversal Stack

When a node p indicates a frequent n-itemset $e=i_1 i_2 \ldots i_n$ in the prefix tree $P_x$, information of every node on the path from the root node to the node p, i.e., $(i_1, C_k(i_1)) \rightarrow (i_2, C_k(i_1 i_2)) \rightarrow \ldots \rightarrow (i_n, C_k(i_1 i_2 \ldots i_n))$ is inserted into a traversal stack in the same order as in the path. A traversal stack t_stack is an array of elements (i, c). A j-th element of the traversal stack t_stack indicates a j-th item $i_j$ of the itemset e and the current count $C_k(e_j)$ of its corresponding itemset $e_j=i_1 i_2 \ldots i_j$. That is, t_stack[j]=$(i_j, C_k(e_j))$ indicates t_stack[j].i=$i_j$ and t_stack[j].c=$C_k(e_j)$. The current information of the itemset e in the traversal stack t_stack is also referred by the top pointer of the stack, i.e., t_stack[top]=t_stack[n].

First, a process of generating an ordered association rule using the traversal stack will be described. When the path from the root node to the current node corresponding to a frequent n-itemset $e=i_1 i_2 \ldots i_n$ is inserted into the traversed stack, all of the ordered rules are generated as follows. The current confidence of the first ordered rule $i_1 \rightarrow i_2 \ldots i_n$ can be calculated by computing t_stack[top].c/t_stack[1].c=$C_k(e)/C_k(i_1)$. If this value is greater than or equal to a minimum confidence $C_{min}$, which is a predetermined threshold value, the above association rule is generated. Similarly, an ordered association rule $i_1 i_2 \ldots i_j \rightarrow i_{j+1} \ldots i_n$ is examined by computing t_stack[top].c/t_stack[j].c=$C_k(e)/C_k(i_1 i_2 \ldots i_j)$. FIG. 3 shows the algorithm of a method of generating all the ordered association rules of a frequent itemset e using the traversal stack.

Next, a process of generating an unordered association rule using the traversal stack will be described. When information on the path from the root node to the current node that indicates an itemset e corresponding to a frequent n-itemset $e=i_1 i_2 \ldots i_n$ is inserted into the traversed stack, the unordered association rule is divided into two sets, that is, a set A1 and a set A2, in this embodiment. The set A1 contains the first item $i_1$ in the antecedent of the unordered association rule, and the set A2 contains the first item $i_1$ in the consequent of the unordered association rule. All the unordered association rules can be generated by scanning the array of the traversal stack of the first and second sets A1 and A2 twice. In this embodiment, for the efficient generation of association rules, the antecedent of an unordered association rule is divided into three exclusive parts, that is, predecessors, alternatives, and combinators, while its consequent is the remaining items of the itemset e, which will be described in more detail below.

For the first set A1 starting from a (top−1)-th element of the traversal stack, the items of the traversal stack are categorized into the three parts. When a j-th element of the traversal stack is examined, all the unordered association rules that satisfy the following two conditions are generated:

i) the j-th item of the itemset e is included in the consequent; and ii) all the items t_stack[k].i ($2 \leq k \leq j-1$) before the j-th item are in the antecedent.

The items t_stack[k].i ($2 \leq k \leq j-1$) are before the j-th element of the traversal stack. All the predecessors should be included in the antecedent to satisfy the second condition. In contrast, the items after the j-th element of the traversal stack become the alternatives. Each node of the subtree rooted at the node corresponding to the itemset composed of the predecessors and one of the alternatives can produce an association rule satisfying the above conditions. For each alternative item, its combinator items are those items that are lexicographically after the alternatives. FIG. 4A shows all the possible unordered association rules that are generated from a frequent n-itemset $e=i_1 \ldots i_n$. When the j-th element of the traversal stack shown in FIG. 4B is examined, its predecessors are $i_1, \ldots, i_{j-1}$. Therefore, the association rules that contain all the predecessors in their antecedents and contain the j-th item $i_j$ in their consequent are generated. For one $i_k (j+1 \leq k \leq n)$ of the alternatives $i_{j+1} \ldots i_n$, all the items t_stack[l] ($k+1 \leq l \leq n$) after the alternative $i_k$ become the combinators. Therefore, there are $2^{n-k}$ number of possible unordered association rules for the subtree $S(i_j)$ rooted at the node corresponding the itemset $i_1 i_2 \ldots i_{j-1} i_k$.

After examining the possible unordered association rules of the first set A1, the elements of the traversal stack are processed once more in reverse order to examine the association rules of the second set A2. For the j-th element ($2 \leq j \leq n$) of the traversal stack as shown in FIG. 4C, all the nodes of the subtree rooted at the 1-item $i_j$ are examined by the same manner as that in the first set. In this case, the item $i_j$ becomes the predecessor while the items t_stack[k] ($1 \leq k \leq j-1$) before the j-th element are included in the consequents. To examine all the nodes of this subtree, the remaining items t_stack[l] ($j+1 \leq l \leq n$) are combinators while there is no alternative. FIG. 5 is a diagram illustrating the algorithm of a method of generating all the unordered association rules for a frequent itemset e using the traversal stack as described above.

FIG. 6 illustrates an example of the generation of all the association rules of a 3-itemset abc according to an embodiment of the invention. In this embodiment, the association rule is generated with a minimum support $S_{min}$ of 0.1 and a minimum confidence $C_{min}$ of 0.7. A node $m_{10}$ is visited first since information on all the nodes in the path from the root node to the node $m_{10}$ is inserted into the traversal stack t_stack. All the ordered association rules that can be generated from the frequent itemset abc are shown in FIG. 6B. The first ordered association rule a→bc is valid since t_stack[top].c/t_stack[1].c=$C_k(abc)/C_k(a) \geq C_{min}$ is established. Likewise, the next ordered association rule ab→c is also valid since t_stack[top].c/t_stack[2].c=$C_k(abc)/C_k(ab) \geq C_{min}$ is established.

Meanwhile, the unordered association rule is generated as follows. For the first set A1 of the itemset abc, the traversal stack t_stack[2] is processed only. Therefore, when the item t_stack[2].i=b is in the consequent, the predecessor, the alternative, and the combinator become a, c, and b, respectively, so that the first unordered association rule ac→b can be generated from the first set A1. The confidence of the association rule is computed by t_stack[top].c/$C_k(ac) \geq C_{min}$ by visiting a node $m_6$. In contrast, the unordered association rule of the second set A2 is generated as follows. When the predecessor is the item t_stack[2].i=b, the item c becomes the combinator while the items a should be in the consequent. Therefore, an unordered associated rule b→ac is generated after computing the confidence t_stack[top].c/$C_k(b) < C_{min}$ by visiting the node $m_2$. Subsequently, the nodes of its subtree are examined. A child node $m_8$ is processed to find the current count of the itemset bc and the value of t_stack[top].c/$C_k(bc) \geq C_{min}$ is calculated. However, the next child node $m_9$ is not visited since its item is not included in the current traversal stack. Similarly, the node $m_3$ is searched by the same way for the next predecessor c.

FIG. 7 is a flowchart illustrating a method of generating all the current valid association rules for all the frequent itemsets of the prefix tree according to an embodiment of the invention. In this embodiment, in order to find the association rules generated from all the current frequent itemsets, the prefix tree is visited by a pre-order depth-first manner. However, when the first-level nodes are visited, no association rule is generated since the nodes indicate the 1-itemset.

First, in Step 710, a node that is disposed at the leftmost and deepest position of the prefix tree indicating the current frequent itemset from the root node is visited. At that time, information of each of the nodes on the path is stored in the traversal stack in the order in which the nodes are arranged on the path. That is, whenever the nodes are visited while descending to the child nodes, the item represented by the current node visited and the count thereof are stored in the traversal stack.

In Step 720, when the node that is disposed at the leftmost and deepest position of the prefix tree is visited, the association rule of an itemset corresponding to the visited node is generated. At that time, as described above, the ordered association rule and the unordered association rule are generated. In this step, after all the association rules of the visited nodes are generated, information stored in the top, that is, the uppermost layer of the traversal stack is deleted.

In Step 730, when there is a sibling node of the currently visited node, the process proceeds to Step 740 to visit the sibling node, and information of the visited node is stored in the traversal stack. In Step 750, similar to Step 720, the association rule is generated.

In Step 730, when there is no sibling node of the currently visited node, the process proceeds to Step 760 to visit a parent node, and information of the visited node is stored in the traversal stack. In Step 770, similar to Step 720, the association rule is generated.

In Step 780, when the association rules of nodes corresponding to all the frequent itemsets in the prefix tree are not completely generated, the process returns to Step S730 to generate the association rules of the nodes. When the association rules of the nodes corresponding to the all the frequent itemsets in the prefix tree are completely generated in Step 780, the process ends.

FIG. 8 shows the algorithm of a method of generating all the current valid association rules for all the frequent itemset of the prefix tree, and FIG. 9 shows association rules generated from the prefix tree shown in FIG. 6. Referring to FIG. 8, the association rules are generated from each of the visited nodes according to the algorithms shown in FIGS. 3 and 5. According to the algorithm shown in FIG. 8, the confidence of the association rule in which all the sub-itemsets of an itemset corresponding to each of the visited nodes become the antecedent is calculated, and then compared with the minimum confidence to generate the association rule. This method is called an Assoc-all method in the specification for convenience.

Next, a method of reducing a tree search space when generating all the current valid association rules for all the frequent itemsets of the prefix tree will be described. The method of generating the association rules shown in FIG. 8 examines all the association rules generated from the itemsets corresponding to the visited nodes. However, it is possible to reduce a tree search space using an anti-monotone property for the itemset. The total processing time can be shortened by minimizing the number of visited nodes in the process of generating all the association rules of a prefix tree. In order to examine all the association rules generated by a specific frequent itemset e in the traversal stack, all the sub-itemsets of the itemset e except for an empty set are regarded as the antecedents of the association rules that can be generated.

Therefore, the Assoc-all method examines the confidence of every possible association rule by visiting the nodes corresponding to all the subsets of the itemset e.

However, if a specific sub-itemset $v \subset e$ fails to generate an association rule, no association rule in which the antecedent is any one of the sub-itemsets of an itemset v can be generated by the following Theorem 1. Therefore, the tree search space of the Assoc-all method can be reduced.

Theorem 1. Given the minimum confidence $C_{min}$ and two frequent itemsets X and Y ($X \subset I$, $Y \subset I$, and $X \subset Y$), if an association rule $X \rightarrow Y-X$ is not generated, no association rule whose antecedent is a sub-itemset of X can be generated.

Proof. Since the association rule $X \rightarrow Y-X$ is not valid, $S(Y)/S(X)<C_{min}$ is established. Let Z be a sub-itemset of X ($Z \subset X$). By the antimonotone property, $S(Z) \geqq S(X) \geqq S(Y)$. Therefore, $S(Y)/S(Z) \leqq S(Y)/S(X)<C_{min}$ can be derived. Hence, no association rule $Z \rightarrow Y-Z$ is generated. Therefore, when the confidence of the association rule having, as the antecedent, any one of the sub-itemsets of the itemset whose association rule will be generated is smaller than the minimum confidence, the confidence of the association rule having as the antecedent any one of the sub-itemsets of the itemset is not examined, that is, any one of the sub-itemsets of the itemset is not visited. In this way, it is possible to reduce the tree search space.

For example, given a prefix tree $P_k$ of the current data stream $D_k$, let $e_1$ be a sub-itemset of the itemset e ($e = \supset e_1$). When a node corresponding to the itemset e is visited to find the association rules generated from the itemset e, if an association rule $e1 \rightarrow e-e_1$ is not generated, there is no need to visit the node corresponding to a sub-itemset $e_2$ in order to find an association rule whose antecedent is $e_2$ ($e_2 \subset e_1$). Therefore, it is not necessary to visit all the nodes corresponding to the sub-itemsets of $e_1$. For instance, in FIG. 6, let's suppose a node $m_{12}$ corresponding to a frequent itemset abcd is visited currently. If an association rule $bcd \rightarrow a$ is not generated, that is, $S(abcd)/S(bcd)<C_{min}$, association rules $bc \rightarrow ad$ and $b \rightarrow acd$ are not also generated since $S(bcd) \leqq S(bc) \leqq S(b)$. In addition, association rules $c \rightarrow abd$, $cd \rightarrow ab$, and $d \rightarrow abc$ are not also generated. Therefore, the nodes indicating the sub-itemsets of the itemset bcd do not need to be visited. This method is called an Assoc-all-anti method in the specification for convenience.

Next, a process of generating an ordered association rule and an unordered association rule in the Assoc-all-anti method will be described in detail.

First, the ordered association rule will be described. When information of nodes on a path from the root node to a node indicating a frequent n-itemset $e = i_1 i_2 \ldots i_n$ is stored in the traversed stack, all of the ordered association rules are generated as follows. The confidence of a first ordered rule $i_1 \ldots i_{n-1} \rightarrow i_n$ is examined by computing t_stack[top].c/t_stack[top-1].c=$C_k(e)/C_k(i_{n-1})$. If this value is smaller than $C_{min}$, no association rule having the sub-itemsets of the itemsets $i_1 \ldots i_{n-1}$ as its antecedent is generated. FIG. 10 shows the algorithm of a process of generating the ordered association rule in the Assoc-all-anti method. When the Assoc-all-anti method is used to generate the ordered association rule, the sequence of examining the sub-itemsets of the itemset e is exactly reverse to that in the Assoc-all method, which can be known from the comparison between the third line of the algorithm shown in FIG. 3 and the third line of the algorithm shown in FIG. 10.

Next, the generation of the unordered association rule will be described. When information of nodes on a path from the root node to a node indicating a frequent n-itemset $e = i_1 i_2 \ldots i_n$ is stored in the traversed stack, the Assoc-all-anti method according to the algorithm shown in FIG. 11 generates all the unordered association rules from the itemset e as follows. This process is divided into two steps. In the first step, the nodes of the prefix tree $P_k$ are visited by post-order traversal in order to reach a node satisfying the following two conditions:

1) An itemset indicated by the node is a subset of the itemset e; and

2) An item which precedes lexicographically to the last item of an itemset e is included in the itemset indicated by the node.

In each visited node in the path, the above two conditions are examined. If one of the above two conditions is not satisfied, none of its descendant nodes needs to be visited. This is because there is no node corresponding to a proper sub-itemset of the itemset e in the descendant nodes. When a node corresponding to an itemset $e_1$ satisfies the two conditions, the second step is performed to compute the confidence of an association rule e1→e–$e_1$. If the confidence is less than the minimum confidence $C_{min}$, no association rule whose antecedent is any sub-itemset of $e_1$ is generated by Theorem 1. Therefore, none of the sub-itemsets of $e_1$ is examined. In contrast, by traversing the prefix tree, all the sub-itemsets $e_2$ of the itemset $e_1$ are looked up to see whether an association rule $e_2$→e–$e_2$ can be generated. The generation of the unordered association rule by the two steps is repeated until no node in the prefix tree satisfies the above two conditions. However, the first step takes relatively long time since all the paths of the prefix tree should be examined. As a result, the performance of the Assoc-all-anti method is sensitively affected by the size of the prefix tree. FIG. 11 shows a search_subtree_anti procedure that should replace the invocations of the search_subtree routine in the gen_unordered_rule( ) procedure shown in FIG. 5 in order to generate all the unordered association rules by the Assoc-all-anti method.

Next, a method of generating all the association rules having a specific itemset in its antecedent according to an embodiment of the invention will be described. This method is called an Assoc-X method in the specification for convenience. To generate all the association rules each having a specific itemset X in its antecedent, the current supports of all the supersets of the itemset X should be searched in the prefix tree. For a superset e of the itemset X ($X \subset e$), an association rule X→(e–X) can be generated when the itemsets X, e, and e–X are frequent ($\geq S_{min}$). Furthermore, the performance of this process can be further enhanced by reducing the number of visited nodes by the following Theorem 2.

Theorem 2. Given a minimum confidence $C_{min}$, if an association rule X→Y is not generated for two itemsets X and Y ($X \subset I$ and $Y \subset I$), an association rule X→$\overline{Y}$ for any superset $\overline{Y}(Y \subset \overline{Y})$ of the itemset Y is not also generated.

Proof. If the association rule X→Y is not generated, $S(X \cup Y) < C_{min} \cdot S(X)$ is satisfied. Since $\overline{Y} \supset Y$, $S(X \cup \overline{Y}) \leq S(X \cup Y)$ is also satisfied. Hence, $S(X \cup \overline{Y}) < C_{min} \cdot S(X)$ is satisfied, which implies the rule X→$\overline{Y}$ cannot be generated.

For a given n-itemset X=$i_1 i_2 \ldots i_n$ ($X \subset I$), the paths of the prefix tree $P_k$ are searched by pre-order traversal to reach a node corresponding to a superset of the itemset X. However, for a node w corresponding to a v-itemset $\overline{e}=\overline{I}_1 \overline{I}_2 \ldots \overline{I}_v$, none of its descendant nodes needs to be visited if one of the following three conditions is met:

i) $S(\overline{e}) < S_{min}$;

ii) An item $i_j$ ($i_j \in X$) satisfies $i_j \notin \overline{e}$, $i_j \propto i_v$ and $i_v \notin X$ (No descendant node of the node w cannot contain the itemset X due to the lexicographical order of items); and iii) $S(\overline{e})/S(X) < C_{min}$ (by Theorem 2).

For example, in FIG. 6, when a node $m_8$ corresponding to the itemset bc is visited currently to find all the association rules each having the itemset bc in its antecedent, the supports of all the supersets of the itemset bc need to be found. If an association rule bc→a is not generated at the node $m_{10}$ corresponding to the itemset abc due to $S(abc)/S(bc) < C_{min}$, no additional association rule is generated in the descendant nodes of the node $m_{10}$. In addition, a descendant node $m_{12}$ does not need to be visited since $S(abcd) \leq S(abc)$ leads to $S(abcd)/S(bc) < C_{min}$. In the remaining process of finding all the supersets of the itemset bc, when a node $m_6$ corresponding to an itemset ac is visited, the traversal of the prefix tree stops since all the descendents of the node $m_6$ do not have the item b. FIG. 12 illustrates the algorithm of a method of generating all the association rules each having a specific itemset in its antecedent by an Assoc-X method.

Next, a method of generating all the association rules each having a specific itemset in its consequent according to an embodiment of the invention will be described. This method is called an Assoc-Y method in the specification for convenience. Unlike the Assoc-X method, the Assoc-Y method finds all the association rules X→Y each having a specific itemset in its consequent. In order to generate all the association rules each having a specific itemset Y in its consequent, the current supports of all the supersets of the itemset Y need to be found in the prefix tree. For a fixed n-itemset Y=$i_1 i_2 \ldots i_n$ ($Y \subset I$), the paths of the prefix tree $P_k$ are searched by pre-order traversal to find a node corresponding to a superset of the itemset Y. However, for a node w corresponding to a v-itemset $\overline{e}=\overline{I}_1 \overline{I}_2 \ldots \overline{I}_v$, no descendant node needs to be visited if one of the following conditions is met:

i) $S(\overline{e}) < S_{min}$;

ii) An item $i_j$ ($i_j \in Y$) satisfies $i_j \notin \overline{e}$, $i_j \propto i_v$ and $i_v \notin Y$; and iii) $S(\overline{e})/S(\overline{e}-Y) < C_{min}$.

FIG. 13 shows the algorithm of a method of generating all the association rules each having a specific itemset in its consequent according to an embodiment of the invention. Upon visiting the nodes of a path, the items on the path that do not belong to the itemset Y are inserted into a separate temporary stack (x_stack) in order to find the items that can be disposed in the consequents. For example, in FIG. 6, let's suppose that the node $m_8$ corresponding to the itemset bc is visited currently to find all the association rules whose consequents are the itemset Y=bc. Upon visiting the node $m_{10}$ corresponding to the itemset abc, these items are stored in the traversal stack, and an item 'a' to be included in the consequent has already been inserted into the stack x_stack. If the support of the itemset abc is greater than or equal to $S_{min}$, the support of the item a can be searched by visiting a node $m_1$. If $S(a) \geq S_{min}$, $S(abc)/S(a) \geq C_{min}$ is satisfied, and an association rule a→bc is generated.

FIG. 14 is a block diagram illustrating a data mining system that generates an association rule.

A prefix tree storage unit 1420 stores a prefix tree that manages itemsets included in a transaction that is generated from a data stream and the count of the itemsets. Each node of the prefix tree includes information on the count of a specific itemset corresponding to each node and a specific item. The prefix tree stored in the prefix tree storage unit 1420 has the same meaning as described above, and thus a detailed description thereof will be omitted.

A prefix tree updating unit 1410 receives the transaction generated from the data stream, and updates information of a node corresponding to the itemset or adds a new node to the prefix tree, according to the itemset included in the received transaction and the count of the itemset. The operation of the prefix tree updating unit 1410 is the same as that described in Step 130 shown in FIG. 1, and thus a detailed description thereof will be omitted.

A frequent itemset selecting unit 1430 compares the support of the itemset corresponding to each node of the prefix tree stored in the prefix tree storage unit 1420 with the minimum support, which is a predetermined threshold value, to select frequent itemsets. The operation of the frequent itemset selecting unit 1430 is the same as that described in Step 140 shown in FIG. 1, and thus a detailed description thereof will be omitted.

An association rule generating unit 1450 visits some or all of the nodes corresponding to the frequent itemsets selected by the frequent itemset selecting unit 1430, and generates association rules using information of the visited nodes. Meanwhile, the association rule generating unit 1450 stores the items, which are included in the nodes on the path from the root node to a node corresponding to the itemset for the generation of an association rule, and the count of the items in a traversal stack 1440 in the order of the nodes on the path during a process of generating the association rule, and generates the association rule on the basis of the information stored in the traversal stack 1440. The operation of the association rule generating unit 1450 and the traversal stack 1440 is the same as described in Step 150 shown in FIG. 1, and thus a detailed description thereof will be omitted.

Next, the performances of the above-described methods are analyzed by data sets shown in Table 15. Referring to FIG. 15, |T|, |I|, |D|, and N denote an average transaction size, an average maximal potentially frequent itemset size, the total number of transactions, and the total number of unit items forming a data set, respectively. Except for a data set Weblog, the data sets are generated by the same method as described in <R. Agrawal, T. Imielinski, and A. Swami, "Mining Association Rules between Sets of Items in Very Large Databases" Proc. ACM SIGMOD Conf. Management of Data, pp. 207-216, May 1993. The data set Weblog is generated from webpage access log data. The data set Weblog is composed of 545 items and 500,000 transactions, and the minimum, maximum, and average numbers of items appearing in on transaction are 2, 30, and 5, respectively. The ratio of the average length of a transaction to the total number of items in a data set is defined as the transaction-density $\rho_T(D)$ of items of each data set, which is represented as follows:

$$\rho_T(D)=|T|/N\times100(\%).$$

The transaction-density of the data set is used to evaluate the degree of the density of unit items in the data set.

In all experiments, the transactions are looked up one by one in sequence to simulate an online data stream environment. In addition, the value of $S_{sig}$ is set to $0.1\times S_{min}$ if not specified. All experiments are performed using a 3.0 GHz Pentium PC with a 1 GB memory in a Ubuntu Linux 5.1 environment, and all programs are implemented in C.

FIGS. 16A to 16C show the result of the comparison between the performance of the Assoc-all method and the performance of the Assoc-all-anti method on four data sets. In this experiment, the value of $S_{min}$ is set to 0.001. FIG. 12A illustrates a variation in the size of the prefix tree that is generated for each data set. As the value of $\rho(D)$ becomes larger, the size of the prefix tree becomes larger, and the average length of the paths forming the prefix tree becomes longer. For this reason, the length of the prefix tree is proportional to $\rho(D)$, as shown in FIG. 12B. The pruning operation of the Assoc-all-anti method performed in post-order traversal is very sensitively affected by the height of the prefix tree. As a result, the processing time of the Assoc-all-anti method is much longer than that of the Assoc-all method. However, when $\rho(D)=0.3$, the Assoc-all-anti method is slightly more efficient than the Assoc-all method since the path of the prefix tree is much shorter. FIG. 16C shows the number of visited nodes in this experiment. As shown in FIG. 16C, the number of visited nodes by the Assoc-all method is much smaller than that by the Assoc-all-anti method, especially when the density of data sets is high. For each data set, the Assoc-all method and the Assoc-all-anti method utilize the same amount of memory space and provide the same mining accuracy since the two methods use the same prefix tree. The subsequent experiments are conducted to search the characteristics of the Assoc-all method on the basis of these results.

FIGS. 17A to 17C show the performance of the Assoc-all method using a data set T10.I4.D1000K. The transactions added in FIGS. 17A to 17C are sequentially divided into 5 intervals each of which includes 200K transactions and a force-pruning operation is performed for every 1K transactions. Since the nodes generated in the prefix tree have the same size, the memory usage in each interval is represented by the maximum number of nodes of the prefix tree. FIG. 17A shows the memory usage according to a variation in the value of $C_{min}$ in each interval. FIG. 17B shows a variation in the average processing time when the transaction is added, and FIG. 17C shows the effect of the value of $S_{min}$ on the average processing time. As expected, the number of generated association rules is inversely proportional to both the values of $S_{min}$ and $C_{min}$.

In order to measure the effect of the data set on the transaction density, experiments are performed on three data sets having the same value of |I|. FIG. 18A shows the proportional relationship between the size of the prefix tree and the density of the data set. As the size of |T| increases, the size of the prefix tree increases. For this reason, the average processing time increases in proportion to the value of |T| as shown in FIG. 18B.

FIGS. 19A to 19C show the evaluation of the performance of the Assoc-all method according to a variation in $S_{sig}$ with respect to $S_{min}$, which is the fixed value. The smaller the value of $S_{sig}$ becomes, the larger the number of items managed by the prefix tree becomes, which requires a large memory space. FIGS. 19B and 19C show the effect of $S_{sig}$ on the average processing time. The larger the value of $S_{sig}$ becomes, the smaller the number of itemsets maintained in the prefix tree becomes, which results in a reduction in the average processing time.

To measure the relative accuracy of the methods proposed in the invention, a term average confidence error $ACE(R_2|R_1)$ is defined. When two sets of association rules $AR_1=\{(r_i,C_k^1(r_i))|C_k^1(r_i)\geq C_{min}\}$ and $AR_2=\{r_j,C_k^2(r_j)|C_k^2(r_j)\geq C_{min}\}$ are given for the same data stream $D_k$, the relative accuracy of $R_2$ over $R_1$ is defined by $ACE(R_2|R_1)$ as follows:

$$ACE(R_2|R_1)=\frac{\sum_{r_l\in R_1-R_1\cap R_2}C_k^1(r_l)+\sum_{r_l\in R_2\cap R_2}\{|C_k^2(r_l)-C_k(r_l)|\}+\sum_{r_l\in R_2-R_1\cap R_2}C_k^2(r_l)}{|R_1|}.$$

As the value of $ACE(R_2|R_1)$ becomes smaller, the association rules of $R_2$ is more similar to those of $R_1$.

As shown in FIG. 20A, the ACE $(R_{proposed\ method}|R_{apriori})$ becomes small as the processing of the estDec method is stabilized. As shown in FIG. 20B, the ACE is little affected by the value of $C_{min}$ except when few association rules are generated.

FIGS. 21A to 21C show the performances of the Assoc-X and Assoc-Y methods using the data set T10.I4.D1000K when $S_{min}$ is set to 0.001 and $C_{min}$ is set to 0.5. In FIGS. 21A to 21C, assoc-x-thm2 denotes the method that employs the pruning strategy defined by Theorem 2. As the length of a specific antecedent or consequent is increased, a search space becomes smaller. Therefore, the number of nodes to be visited is decreased, as shown in FIG. 21A. For the same reason, the average processing time is inversely proportional to the length of a fixed itemset. FIG. 21C illustrates the measured results of the mining accuracies of the three methods. Because they use the same prefix tree of the data set, they have the same accuracy. As the length of a fixed itemset increases, the accuracy is slightly increased. Compared with the Assoc-all method, these methods take much shorter time to generate all the association rules of an interesting itemset (order of $10^3$).

The total number of association rules generated for the values of $S_{min}$ and $C_{min}$ on a data stream can be varied continuously over time. On the other hand, the up-to-date mining result of an on-line data stream should be traced in real-time and available at any moment. Considering the continuity of a data stream, the conventional two-step approach for generating the association rules from a finite data set is not efficient in a data stream any longer. The invention proposes a method of generating all the association rules directly using the current frequent itemsets that are continuously changed, by monitoring the current supports of all the frequent itemsets in an online data stream by using the prefix tree of the estDec method. All the association rules can be effectively generated from each frequent itemset maintained in the prefix tree using the traversal stack. Furthermore, the Assoc-X and Assoc-Y methods can meet users' demands for the finding of all the association rules generated from a specific itemset.

Meanwhile, the above-described embodiments of the invention can be incorporated into a computer readable program, and executed by a general-purpose digital computer that operates the program using a computer readable recording medium. The computer readable recording media include magnetic storage media (for example, a ROM, a floppy disk, and a hard disk), optical recording media (for example, a CD-ROM and a DVD), and a carrier wave (for example, transmission through the Internet).

Although the embodiments of the invention have been described above, it will be apparent to those skilled in the art that various modifications and changes may be made without departing from the scope and spirit of the present invention. Therefore, it should be understood that the above embodiments are not limitative, but illustrative in all aspects. The scope of the present invention is defined by the appended claims rather than by the description preceding them, and therefore all changes and modifications that fall within metes and bounds of the claims, or equivalents of such metes and bounds are therefore intended to be embraced by the claims.

What is claimed is:

1. A computer-implemented method of generating association rules from a data stream, the data stream being a non-limited data set composed of transactions generated continuously, the computer-implemented method comprising:

when itemsets included in the generated transactions and counts of the itemsets are managed using a prefix tree and each node of the prefix tree has information on the count of a specific itemset corresponding to the node and a specific item, updating, using a computer processor, information of a node corresponding to the itemset or adding, using a computer processor, a new node based on the itemset included in the generated transaction and the count of the itemset;

comparing, using a computer processor, a support of the itemset corresponding to each of the nodes of the prefix tree with a minimum support to select frequent itemsets, the minimum support being a predetermined threshold value; and visiting, using a computer processor, at least one of the nodes corresponding to the selected frequent itemsets, and generating, using a computer processor, an association rule based on information associated with each of the visited nodes.

2. The method of claim 1, wherein the generating of the association rule includes:

storing, in a stack, items included in each of the nodes on a path from a root node to a node corresponding to an itemset for which an association rule is to be generated, and the counts of the items in the order of the nodes on the path; and generating the association rule for the itemset using the items and the counts of the items stored in the stack.

3. The method of claim 2, wherein, when the items included in the itemset are lexicographically arranged, the generating-the-association-rule step includes:

generating an ordered association rule in which all the items included in its antecedent precede lexicographically to the most preceding one of the items included in its consequent; and generating an unordered association rule other than the ordered association rule among the association rules for the itemset.

4. The method of claim 3, wherein, in the generation of the ordered association rule, when the itemset is an n-itemset $e=i_1,i_2 \ldots i_n$, the count of the itemset $i_1 i_2 \ldots i_j$ stored in a j-th layer (j=1, 2, ..., n–1) of the stack is t_stack[j].c, and the count of the itemset $i_1 i_2 \ldots i_n$ stored in the uppermost layer of the stack is t_stack[top].c, a confidence of an association rule $i_1 i_2 \ldots i_j \rightarrow i_1 i_2 \ldots i_n$ is calculated by t_stack[top].c/ t_stack[j].c, and the calculated confidence is compared with a minimum confidence to generate the association rule, the minimum confidence being a predetermined threshold value.

5. The method of claim 3, wherein, in the generation of the unordered association rule, when the itemset is an n-itemset $e=i_1 i_2 \ldots i_n$, an association rule having the item $i_1$ in its antecedent is generated and an association rule having the item $i_1$ in its consequent is generated, based on the item and the count thereof stored in the stack.

6. The method of claim 1, wherein, in the generating of the association rule, the nodes are visited according to a pre-order depth-first manner, and the association rule for the itemset corresponding to each of the visited nodes is generated.

7. The method of claim 1, wherein the generating of the association rule includes:

storing, in a stack, information of each of the nodes on a path from a root node to an arbitrary node in the order of the nodes on the path;

generating an association rule for an itemset corresponding to the arbitrary node using the information stored in the stack;

deleting information on an item corresponding to the arbitrary node and the count of the item corresponding to the arbitrary node, visiting a sibling node or a parent node of the arbitrary node, or both, and storing information of the visited sibling node or parent node, or both, in the stack, the count of the item corresponding to the arbitrary node being stored in the uppermost layer of the stack; and generating an association rule for an itemset corresponding to the sibling node or the parent node, or both, using the information stored in the stack.

8. The method of claim 7, wherein, when the items included in the itemset are lexicographically arranged, the generating of the association rule for the itemset corresponding to the arbitrary node includes:

generating an ordered association rule in which all the items included in its antecedent precede lexicographically to the most preceding one of the items included in its consequent; and generating an unordered association rule other than the ordered association rule among the association rules for the itemset.

9. The method of claim 7,

Wherein, when the items included in the itemset are lexicographically arranged, the generating of the association rule for the itemset corresponding to the sibling node or the parent node, or both, includes:

generating an ordered association rule in which all the items included in its antecedent precede lexicographically to the most preceding one of the items included in its consequent; and generating an unordered association rule other than the ordered association rule among the association rules for the itemset.

10. The method of claim 7, wherein, in the generating of the association rule for the itemset corresponding to the arbitrary node o, a confidence of an association rule having all subitemsets of the itemset in its antecedent is calculated, and the calculated confidence is compared with a minimum confidence to generate the association rule, the minimum confidence being a predetermined threshold value.

11. The method of claim 7, wherein, in the generating of the association rule for the itemset corresponding to the sibling node or the parent node, or both, a confidence of an association rule having all subitemsets of the itemset in its antecedent is calculated, and the calculated confidence is compared with a minimum confidence to generate the association rule, the minimum confidence being a predetermined threshold value.

12. The method of claim 7, the method further comprising:

examining, using a computer processor, the confidence of an association rule having at least some of the sub-itemsets of the itemset in its antecedent to generate the association rule, wherein a confidence of an association rule having a subset of the sub-itemset in its antecedent is not examined when the confidence of an association rule having any one of the sub-itemsets of the itemset in its antecedent is smaller than a predetermined value.

13. The method of claim 12, wherein, in the generating of the association rule for the itemset for any of the arbitrary node, the sibling node, or the parent node, when the items included in the itemsets are lexicographically arranged, an ordered association rule in which all the items included in its antecedent precede lexicographically to the most preceding one of the items included in its consequent is generated by searching the stack in a descending direction and examining the confidence of the sub-itemsets of the itemset using information stored in the stack.

14. The method of claim 13, wherein an unordered association rule other than the ordered association rule among the association rules for the itemset is generated by visiting each of the nodes of the prefix tree, examining whether the itemset corresponding to each of the nodes is a subset of an itemset for which an association rule is to be generated and whether the itemset precedes lexicographically to the last item of the itemset, examining the confidence of an association rule having the itemset corresponding to the node satisfying the conditions in its antecedent, and not visiting descendant nodes of the node that does not satisfy the conditions.

15. The method of claim 1, wherein, in the generating of the association rule, when an association rule having a specific itemset X in its antecedent is generated, the association rule is generated by a pre-order traversal while visiting each of the nodes corresponding to supersets of the specific itemset X, and when an association rule X→e–X for anyone of the visited nodes is not established, descendant nodes of the visited node are not visited, wherein e is an itemset corresponding to the visited node.

16. The method of claim 1, wherein, in the generating of the association rule, when an association rule having a specific itemset Y in its consequent is generated, the association rule is generated by a pre-order traversal while visiting each of the nodes corresponding to supersets of the specific itemset Y, and when an association rule e–Y→Y for anyone of the visited nodes is not established, descendant nodes of the visited node are not visited, wherein e is an itemset corresponding to the visited node.

17. A non-transitory computer readable recording medium comprising code for allowing a computer to generate association rules from a data stream, the data stream being a non-limited data set composed of transactions generated continuously, where when itemsets included in the generated transactions and counts of the itemsets are managed using a prefix tree and each node of the prefix tree has information on the count of a specific itemset corresponding to the node and a specific item, and where the computer readable recording medium comprises:

code for updating, using a computer processor, information of a node corresponding to the itemset, or code for adding, using a computer processor, a new node based on the itemset included in the generated transaction and the count of the itemset;

code for comparing, using a computer processor, a support of the itemset corresponding to each of the nodes of the prefix tree with a minimum support to select frequent itemsets, the minimum support being a predetermined threshold value; and code for visiting, using a computer processor, at least one of the nodes corresponding to the selected frequent itemsets, and code for generating an association rule based on information associated with each of the visited nodes.

18. A data mining system for generating an association rule from a data stream that is a non-limited data set composed of transactions generated continuously, the system comprising:
- a prefix tree storage unit that manages itemsets included in the generated transactions and counts of the itemsets using a prefix tree and stores the prefix tree in which each node has information on the count of a specific itemset corresponding to the node and a specific item;
- a prefix tree updating unit that updates information of a node corresponding to the itemset or adds a new node on the basis of the itemset included in the generated transaction and the count of the itemset;
- a frequent itemset selecting unit that compares the support of the itemset corresponding to each of the nodes of the prefix tree with a threshold value to select frequent itemsets; and
- an association rule generating unit that visits all or some of the nodes corresponding to the selected frequent itemsets, and generates an association rule based on the information of each of the visited nodes.

19. The system of claim 18, further comprising:
- a stack that stores items included in each of the nodes on a path from a root node to a node corresponding to an itemset for which an association rule is to be generated, and the counts of the items in the order of the nodes on the path,
- wherein the association rule generating unit generates the association rule for the itemset using the items and the counts of the items stored in the stack.

20. The system of claim 19,
- wherein, when the items included in the itemset are lexicographically arranged, the association rule generating unit generates an ordered association rule in which all the items included in its antecedent precede lexicographically to the most preceding one of the items included in its consequent, and generates an unordered association rule other than the ordered association rule among the association rules for the itemset.

* * * * *